(12) United States Patent
Neavin et al.

(10) Patent No.: US 9,162,406 B2
(45) Date of Patent: Oct. 20, 2015

(54) FEEDBLOCK FOR MANUFACTURING MULTILAYER POLYMERIC FILMS

(75) Inventors: Terence D. Neavin, Saint Paul, MN (US); Robert M. Biegler, Woodbury, MN (US); William T. Fay, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 179 days.

(21) Appl. No.: 13/695,463

(22) PCT Filed: Apr. 25, 2011

(86) PCT No.: PCT/US2011/033724
§ 371 (c)(1),
(2), (4) Date: Oct. 31, 2012

(87) PCT Pub. No.: WO2011/139618
PCT Pub. Date: Nov. 10, 2011

(65) Prior Publication Data
US 2013/0042964 A1     Feb. 21, 2013

Related U.S. Application Data

(60) Provisional application No. 61/332,401, filed on May 7, 2010.

(51) Int. Cl.
*B29C 47/06* (2006.01)
*B29D 11/00* (2006.01)
(Continued)

(52) U.S. Cl.
CPC ...... *B29D 11/00788* (2013.01); *B29C 47/0021* (2013.01); *B29C 47/065* (2013.01);
(Continued)

(58) Field of Classification Search
CPC .............. B29C 47/0021; B29C 47/065; B29C 47/145; B29C 47/702; B29C 47/707; B29D 11/00788
USPC .................. 156/182, 244.11, 244.25, 244.27; 264/173.12–173.15, 173.16, 264/173.18–174.11; 425/133.5
See application file for complete search history.

(56) References Cited

U.S. PATENT DOCUMENTS

| 3,557,265 A | 1/1971 | Chisholm |
| 3,743,459 A | 7/1973 | Schrenk |

(Continued)

FOREIGN PATENT DOCUMENTS

| EP | 2147771 | 1/2010 |
| JP | 2003-251675 | 9/2003 |

(Continued)

OTHER PUBLICATIONS

Office Action dated Aug. 28, 2014, U.S. Appl. No. 13/102,089, filed May 6, 2011, 23 pages.

(Continued)

*Primary Examiner* — Scott W Dodds
(74) *Attorney, Agent, or Firm* — Clifton F. Richardson

(57) ABSTRACT

A feedblock including a first packet creator that forms a first packet including a first plurality of polymeric layers, the first plurality of layers including at least four first individual polymeric layers; and a second packet creator that forms a second packet including a second plurality of polymeric layers, the second plurality of layers including at least four second individual polymeric layers, wherein the first and second packet creators are configured such that, for each packet creator, respective individual polymeric layers of the plurality of polymeric layers are formed at approximately the same time. The feedblock may include a packet combiner that receives and combines the first and second primary packets to form a multilayer stream. In some examples, at least one of the first and second primary packets may be spread in the cross-web direction prior to being combined with one another.

21 Claims, 31 Drawing Sheets

(51) Int. Cl.
    *B29C 47/00*     (2006.01)
    *B29C 47/56*     (2006.01)
    *B32B 27/06*     (2006.01)
    *B29C 47/70*     (2006.01)
    *B29L 7/00*     (2006.01)
    *B29L 9/00*     (2006.01)

(52) U.S. Cl.
    CPC .............. *B29C 47/56* (2013.01); *B29C 47/702* (2013.01); *B32B 27/06* (2013.01); *B29C 47/707* (2013.01); *B29C 2947/92704* (2013.01); *B29C 2947/92904* (2013.01); *B29L 2007/008* (2013.01); *B29L 2009/00* (2013.01); *Y10T 156/1712* (2015.01)

(56) References Cited

U.S. PATENT DOCUMENTS

| | | |
|---|---|---|
| 4,426,344 A | 1/1984 | Dinter |
| 5,108,844 A | 4/1992 | Blemberg |
| 5,316,703 A * | 5/1994 | Schrenk ............... 264/1.34 |
| 5,389,324 A | 2/1995 | Lewis |
| 5,516,474 A | 5/1996 | Cloeren |
| 5,795,528 A | 8/1998 | Klein |
| 6,783,349 B2 | 8/2004 | Neavin |
| 6,827,886 B2 * | 12/2004 | Neavin et al. ................ 264/1.6 |
| 6,905,324 B2 | 6/2005 | Cloeren |
| 7,296,992 B2 | 11/2007 | Timmons |
| 7,858,006 B2 | 12/2010 | Furuno |
| 2003/0201565 A1 | 10/2003 | Cloeren |
| 2008/0067712 A1 * | 3/2008 | Osada et al. ............... 264/171.1 |

FOREIGN PATENT DOCUMENTS

| | | |
|---|---|---|
| WO | WO 2011-087983 | 7/2011 |
| WO | WO 2011-119309 | 9/2011 |

OTHER PUBLICATIONS

Final Office Action dated Mar. 12, 2015, U.S. Appl. No. 13/102,089, filed May 6, 2011, 17 pages.

Office Action dated Jun. 19, 2015, U.S. Appl. No. 13/102,089, filed May 6, 2011, 14 pages.

\* cited by examiner

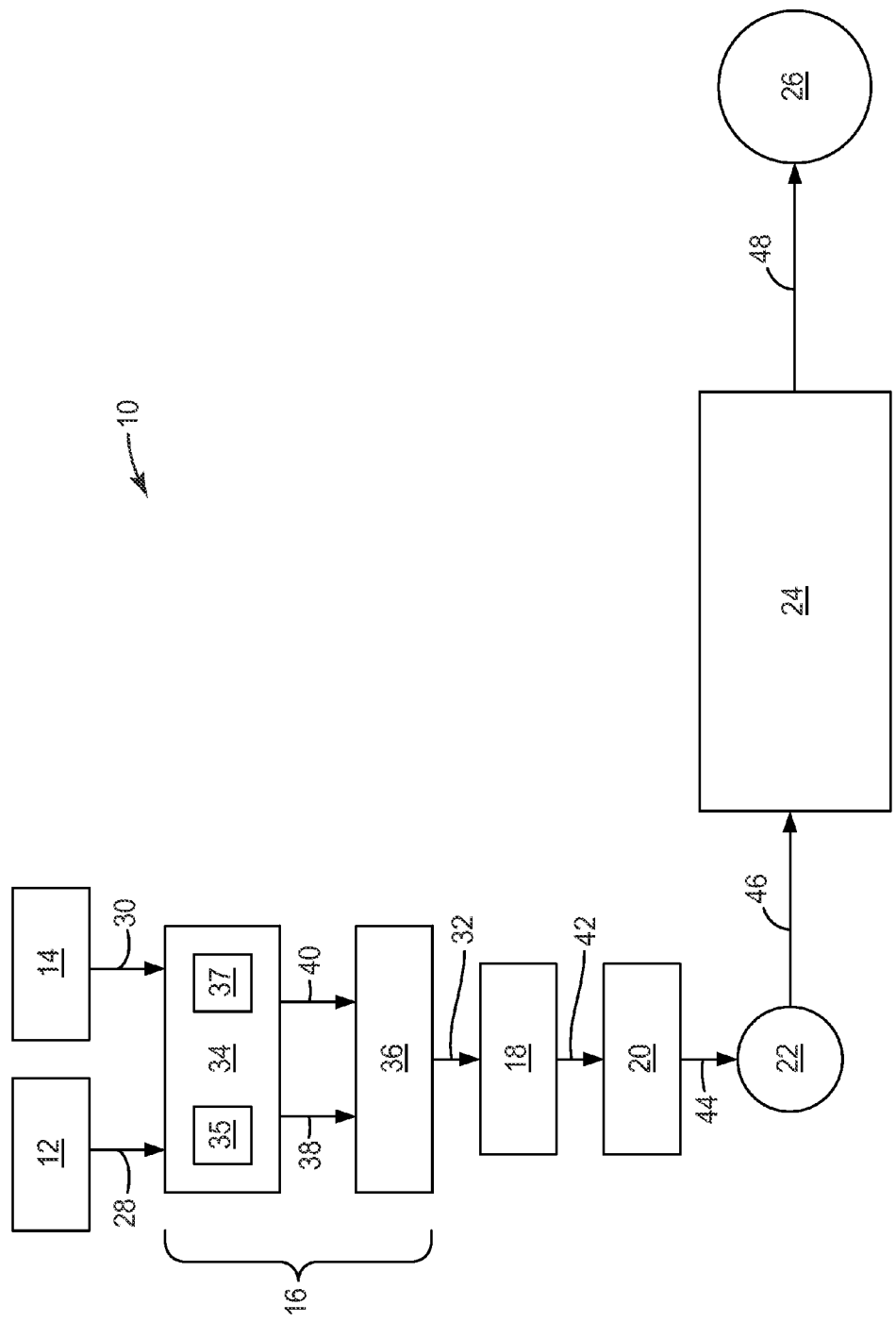

FEEDBLOCK FOR MANUFACTURING MULTILAYER POLYMERIC FILMS

TECHNICAL FIELD

The invention relates to multilayer films and, in particular, apparatuses and techniques for making multilayer polymeric films.

BACKGROUND

Multilayer polymeric films may exhibit a wide range of optical and physical properties, and may be utilized in a variety of optical and non-optical applications. The optical and physical properties of a multilayer film may depend on a number of variables, including the type of polymeric materials used for the individual layers, the overall number of individual layers of a film, and/or the layer thickness profile of a film. As a result, the properties of a multilayer film may be tailored by precisely controlling one or more of these variables during the film manufacturing process.

SUMMARY

In general, the present disclosure relates to apparatuses and techniques that may be utilized to manufacture multilayer films, such as multilayer polymeric films having multiple individual polymeric layers. In some embodiments, a feedblock apparatus used to generate a multilayer flow stream may include a packet creator section that includes two or more packet creators. Each packet creator may be configured to generate a separate primary packet having a plurality of individual layers. In some embodiments, each of the primary packets generated by a packet creator may be generated independently of one another. For example, the number of layers, the layer thickness profile, and/or the type of layer material in a packet may be substantially independent of one or more of the other primary packets generated in the packet creator section.

The feedblock apparatus may further include a packet combiner which may receive the two or more primary packets from the packet creator section and then combine the primary packets into a single multilayer flow stream. In some embodiments, the packet combiner may change the orientation of the received primary packets such that at least a portion of the respective packets are stacked when combined with one another. By combining the at least two primary packets, the multilayer flow stream exiting the packet combiner may include a plurality of layers that is greater than the number of layers in either primary packet generated by the packet creator section. For example, when at least a portion of the respective packets are stacked when combined with one another, at least a portion of the resulting multilayer flow stream may include a number of individual layers greater than or equal to the sum of individuals layers from each primary packet.

An apparatus for manufacturing multilayer polymeric films may be configured to separately receive two or more packets, for example, from a feedblock including multiple packet creators, and then combine the packets to form a single multilayer flow stream. The multilayer flow stream may be further processed in some examples to form a multilayer optical film. In some embodiments, the apparatus may be configured to individually spread the packets in the cross-web direction prior to combining the packets to form the multilayer stream. In this manner, the spreading of the packets in the cross-web direction within the apparatus may be designed and controlled independently of one another prior to being combined into the multilayer flow stream. Additionally or alternatively, the multilayer flow stream may be spread in the cross-web direction after being formed by the combination of the individual packets.

In one embodiment, the disclosure is directed to a feedblock comprising a first packet creator that forms a first packet including a first plurality of polymeric layers, the first plurality of layers including at least four first individual polymeric layers; a second packet creator that forms a second packet including a second plurality of polymeric layers, the second plurality of layers including at least four second individual polymeric layers, wherein the first packet creator is configured such that the first individual polymeric layers are formed at approximately the same time as one another, and the second packet creator is configured such that the second individual polymeric layers are formed at approximately the same time as one another. The packet combiner comprises a first channel that receives the first packet from the first packet creator, and a second channel that receives the second packet from the second packet creator, wherein the first channel and the second channel are configured to combine the first and second packets to form a multilayer stream including the first plurality of polymeric layers and second plurality of polymeric layers.

In another embodiment, the disclosure is directed to a method for manufacturing a multilayer article, the method comprising forming a first packet including a first plurality of polymeric layers via a first packet creator, the first plurality of polymeric layers including at least four first individual polymeric layers; forming a second packet including a second plurality of polymeric layers via a second packet creator, the second plurality of polymeric layers including at least four second individual polymeric layers, wherein the first individual polymeric layers are formed at approximately the same time as one another, and the second individual polymeric layers are formed at the same time as one another; and combining the first packet and the second packet via a packet combining section to form a multilayer flow stream including the first plurality of polymeric layers and second plurality of polymeric layers.

In another embodiment, the disclosure is directed to a feedblock comprising means for forming a first packet including a first plurality of polymeric layers, the first plurality of polymeric layers including at least four first individual polymeric layers; means for forming a second packet including a second plurality of polymeric layers, the second plurality of polymeric layers including at least four second individual polymeric layers, wherein the first creator is configured such that first individual polymeric layers are formed at approximately the same time as one another, and the second packet creator is configured such that the second individual polymeric layers are formed at approximately the same time as one another; and means for combining the first packet and the second packet to form a multilayer flow stream including the first plurality of polymeric layers and second plurality of polymeric layers.

In another embodiment, the disclosure is directed to an assembly for manufacturing a multilayer film, the assembly comprising a first flow channel configured to received a first primary packet, the first primary packet including a first plurality of polymeric layers; and a second flow channel configured to received a second primary packet, the second primary packet including second plurality of polymeric layers, wherein the first channel and the second channel are configured to spread at least one of the first and second packets in a cross-web direction and, after spreading the at least one of the first and second primary packets in the cross-web direction, combine the first and second primary packets to form a multilayer flow stream including the first and second plurality of polymeric layers.

In another embodiment, the disclosure is directed to a method comprising receiving a first primary packet via a first flow channel, the first primary packet including a first plurality of polymeric layers; receiving a second primary packet via a second flow channel, the second packet including second plurality of polymeric layers; spreading at least one of the first primary packet and second primary packet in a cross-web direction; and combining the first primary packet and second primary packet with one another after spreading at least one of the first packet and second packet in the cross-web direction to form a multilayer flow including the first and second plurality of polymeric layers.

In another embodiment, the disclosure is directed to an assembly for manufacturing a multilayer film, the assembly comprising means for receiving a first primary packet via a first flow channel, the first primary packet including a first plurality of polymeric layers; means for receiving a second primary packet via a second flow channel, the second packet including second plurality of polymeric layers; means for spreading at least one of the first primary packet and second primary packet in a cross-web direction; and means for combining the first primary packet and second primary packet with one another after spreading at least one of the first packet and second packet in the cross-web direction to form a multilayer flow including the first and second plurality of polymeric layers.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 1 is a schematic diagram illustrating an example film line that may be used to manufacture a multilayer film.

DETAILED DESCRIPTION

Figure 2A:
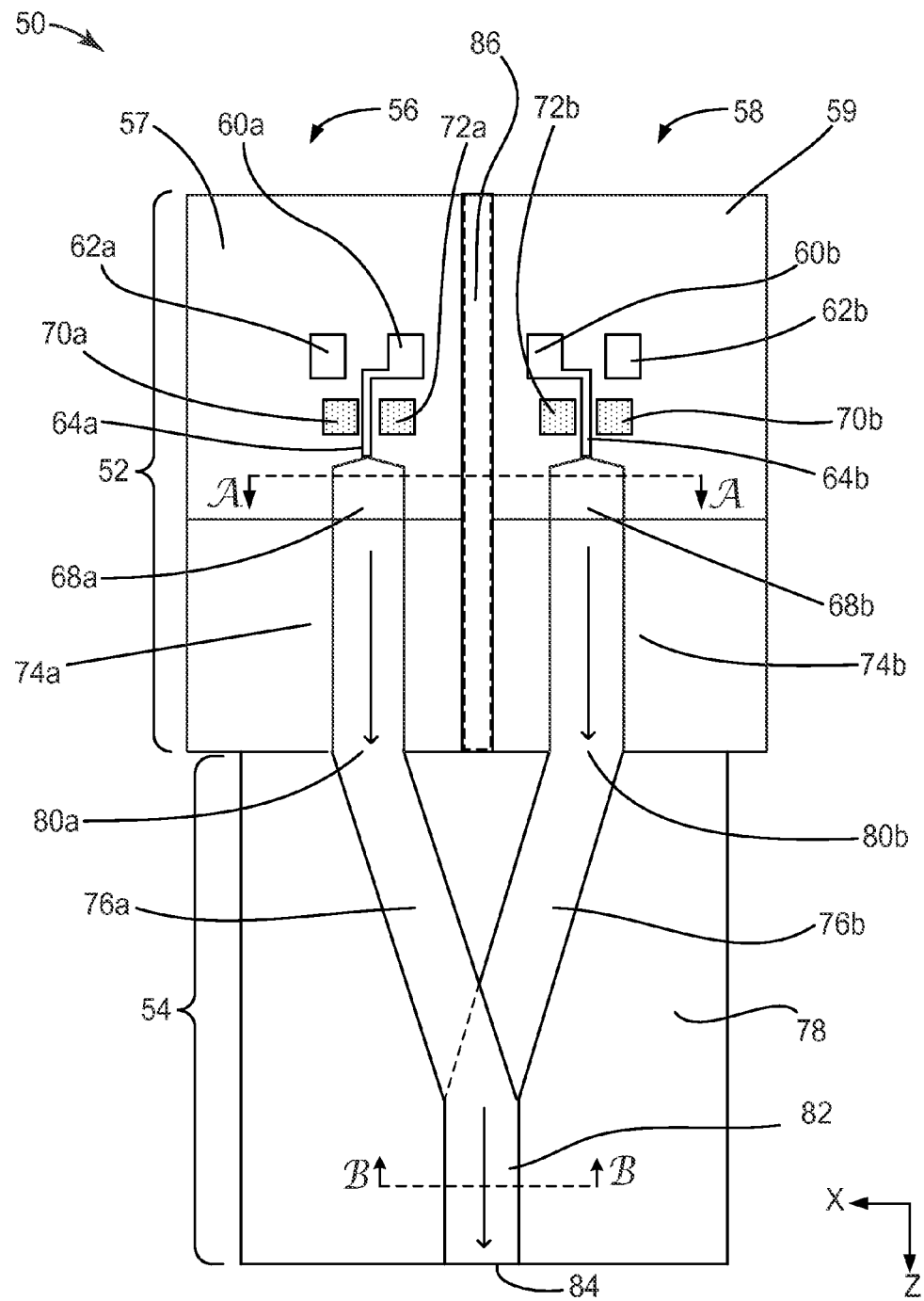
FIGS. 2A and 2B are conceptual diagrams illustrating an example feedblock.

In general, the present disclosure relates to apparatuses and techniques that may be utilized to make multilayer films, such as multilayer polymeric films that have multiple individual polymeric layers. For purposes of illustration, embodiments of the disclosure are generally described with regard to manufacturing multilayer optical polymeric films. However, it is recognized that embodiments of the disclosure are not limited to optical films. For example, embodiments of the disclosure may be useful for manufacturing any multilayer film in which an apparatus, such as a feedblock, receives one or more polymeric film materials to create a multilayer flow stream having individual polymeric layers that may be further processed into a multilayer film. Examples of such multilayer polymeric films may include both optical and non-optical polymeric films.

A multilayer polymeric film may include a plurality of individual layers each formed of one or more types of polymeric materials. For example, certain multilayer optical films may include hundreds of individual polymeric layers alternating between high and low index polymeric materials. The formation of such polymeric layers may be accomplished via a feedblock apparatus that receives suitable polymeric materials, generally in the form of polymeric melt streams, and orients the polymeric materials into a multilayer polymeric flow stream including a stack of individual layers. After exiting a feedblock, the multilayer flow stream may then be further processed within a film line to generate a multilayer optical film. Examples of feedblocks and film lines configured to manufacture multilayer optical films are described, for example, in U.S. Pat. No. 6,783,349 to Neavin et al., titled "Apparatus for Making Multilayer Optical Films".

The multilayer flow stream resulting from the initial orientation of polymeric materials into stacked individual layers by a feedblock may be referred to as a primary or parent packet. Conventionally, the number of individual layers of the multilayer flow stream exiting a feedblock is approximately equal to that of the primary packet generated by the feedblock. Since one or more of the physical and/or optical properties of a multilayer film may depend on the number of individual polymeric layers in the film, it may be desirable to control the number of layers possessed by a primary packet.

However, the number of individual polymeric layers capable of being possessed by a primary packet generated in a feedblock may be limited due to a number of factors. Example factors may include but are not limited to feedblock design and/or practical considerations such as the physical dimension, weight and/or cost of a feedblock capable of generating a desired number of polymeric layers. Accordingly, it may not always be feasible for a feedblock to generate a primary packet having a number of individual layers greater than or equal to the number of layers that are desired for types of multilayer films.

Furthermore, in addition to controlling the number of individual layers of a multilayer optical film, it may also be desirable to precisely control the thickness of the individual layers that make up the multilayer optical film, the combination of which may be generally referred to as a layer thickness profile. For example, one or more physical and/or optical properties of a multilayer optical film may be dependent on the layer thickness profile of the multilayer optical film, in addition to the number of individual layers in the film. In some cases, it may be desirable for a multilayer film to possess a layer thickness profile such that there is a monotonic variation or gradient of layer thicknesses throughout a multilayer film. Deviation of the layer thickness within a multilayer optical film from a target layer thickness profile may result in degradation of the film's performance.

Accordingly, it is generally desirable to precisely control the layer thickness profile of the multilayer flow stream generated by a feedblock, and a variety of techniques may be implemented in the manufacturing process to at least partially provide for control or "tuning" of the layer thickness profile in the multilayer flow stream. For example, as described in U.S. Pat. No. 6,783,349 to Neavin et al., one or more axial rod heaters located proximate to conduits that deliver polymeric melt streams within a feedblock may be used to supply additional heat to the conduits to locally lower the polymeric viscosity and promote additional flow within the conduits. In such cases, the amount of heat added per location may be adjusted and controlled to obtain desirable layer thickness and/or optical spectra of the multilayer film that is manufactured from the primary packet generated by the feedblock.

When the number of individual polymeric layers required for a multilayer optical film exceeds the practical number of layers that can be directly generated by a feedblock, a layer multiplier device (which may also be referred to as a interfacial surface generator) may be used to increase the number of layers in the multilayer flow stream that forms the multilayer film. The multiplier device may receive the multilayer flow stream from a feedblock, which has a number of layers approximately equal to that of the parent packet created by the feedblock, and split the flow stream into two or more sub-streams. Each of these sub-streams may be referred to as secondary packets. The multiplier device may then reorient the two or more secondary packets by stacking the packets on top of one another and then combining the secondary packet to generate a multilayer flow stream with an increased number of individual layers. This process may be repeated on the resulting flow stream until a multilayer flow stream with the desired number of individual layer is achieved.

In some multilayer optical film applications, a multiplier device may be required to split and divide the layers according to a ratio of thicknesses between the secondary packets. The ratio of mass flow of secondary packet "A" to secondary packet "B" may be referred to as the multiplication ratio. In some examples, multiplication ratios may range from approximately 1.0 to approximately 2.0. To achieve desired multiplication ratios between packets using a multiplier device, the physical dimensions of a multiplier may be designed to precisely control the flow channel resistance so that the resulting ratio of the mass flow rates through the channels is equal to the target multiplication ratio desired.

While in some situations the described approach of generating a single parent packet with multiple layers within a feedblock and then increasing the number of layers using a multiplier device may be suitable for manufacturing some multilayer optical films, in some cases, such a process may present one or more undesirable limitations. For example, because each non-primary packet, for example, secondary packets, descends from the single parent packet generated in the feedblock, the number of layers is generally the same in each non-primary packet. Therefore, to such an extent, the exact number of layers present in a multilayer optical film is highly dependent on the number of layers present in the primary packet generated by a feedblock.

Furthermore, as another example, optimal multiplier device design may be performed assuming specific polymeric resins properties, such as, for example, viscosity, and specific process conditions, such as, for example, temperature and flow rate. As a result, if different polymers are used or processing conditions differ from the assumptions used in the original design, the resulting multiplication ratio between packets will likely deviate from the original target ratio. Moreover, if a new multiplication ratio is desired, the flow channels of the multiplier device may need to be mechanically altered, for example, machined, to obtain the correct flow resistances that correspond to the desired multiplication ratio.

As another example, errors in the layer thickness profile that occur in the primary packet are multiplied along with the layers and are present in each of the secondary packets. Moreover, during the multiplication process, the amplitude of the error is often increased relative to the number of times a packet is multiplied, and the zone of influence from the error in the cross-web direction may be increased as well.

As still another example, multiplier device design capabilities may not allow for any means to compensate the multiplication ratio for variations in process conditions or lot-to-lot variations in resin properties during production of multilayer optical films. As a result, there may be deviations in a manufactured multilayer film from a target spectrum due to optical leaks between packets and/or due to overlaps in the layer thickness of respective packets. Furthermore, typical approaches to multiplier design may make it difficult to obtain flow geometries that simultaneously achieve both the target multiplication ratio as well as providing uniform spreading of layer in the cross-web direction.

Embodiments of the disclosure may address one or more of the limitations identified above. As will be described in the greater detail below, in some embodiments, a feedblock may include a packet creator section configured to generate multiple primary packets. The primary packets may be generated independently of one another, which may allow for the one or more properties of each primary packet to be controlled or "tuned" independently of one another. After the primary packets are generated, the primary packets may be combined with one another in a packet combiner to create a multilayer flow stream. In this manner, in some embodiments, the feedblock may create a multilayer flow stream that has a number of individual layers greater than the number feasible for a feedblock to generate in a single primary packet.

FIG. 1 is a schematic diagram illustrating an example film line 10 which may be used to manufacture a multilayer polymeric film. In general, film line 10 may be configured to receive one or more polymeric materials and process the polymeric materials to form a multilayer polymeric film, such as, for example, a multilayer optical film, in which the individual layers of the film include the one or more polymeric materials.

In the example of FIG. 1, film line 10 includes first extruder 12, second extruder 14, feedblock 16, multiplier 18, extrusion die 20, casting wheel 22, orienter 24, and wind-up roll 26. In the embodiment shown, film line 10 is configured to manufacture a multilayer film having individual polymeric layers generally including either first polymeric material 28 or second polymeric material 30. However, as will be explained below, embodiments of the disclosure are not limited to producing a multilayer film having a first polymeric and second polymeric, but instead may include more than two polymers in some examples.

As configured, first polymeric material 28 and second polymeric material 30 may be heated to a temperature equal to or greater than their processing temperature, for example melting and/or glass transition temperature, via first extruder 12 and second extruder 14, respectively, and fed into feedblock 16. Feedblock 16 processes first polymeric material 28 and second polymeric material 30 to form multilayer flow stream 32 that includes multiple individual layers of first material 28 and second material 30.

As multilayer flow stream 32 exits feedblock 16, stream 32 may optionally be fed into layer multiplier 18. Multiplier 18 splits multilayer flow stream 32 into two or more sub-streams, that is, secondary packets, and then may recombine two or more of the respective sub-streams after stacking one or more sub-streams atop another sub-stream to multiply the number of layers in multilayer flow stream 32 into a greater number of layers in multilayer flow stream 42. In other embodiments, multiplier 18 may not be utilized in film line 10.

From multiplier 18, multilayer flow stream 42 enters film extrusion die 20. Extrudate 44 from film extrusion die 20, which is typically in melt form, is cooled on casting wheel 22, which rotates past one or more pinning wires or bands to pin extrudate 44 to casting wheel 22. In some cases, multilayer flow stream 42 may include one or more skin layers.

From casting wheel 22, film 46 may be oriented by orienter 24. For example, orienter 24 may include a length orienter, such as pull rolls, that may stretch film 46 in the longitudinal (machine) direction. As another example, orienter 24 may additionally or alternatively include a tenter that may stretch film 46 in a transverse (cross-web) direction, or may stretch film 24 bi-axially. Film 46 may be stretched by the orienters according to appropriate stretch ratios depending on the properties desired for film 48. Film 48 may then be collected from orienter 24 on windup roll 26.

Still referring to FIG. 1, feedblock 16 includes packet creator section 34 and packet combiner 36. Packet creator section 34 includes first packet creator 35 and second packet creator 37. As will be described in further detail below, each packet creator may be configured to independently generate a single primary packet, that is, each individual packet creator generates a single primary packet corresponding to individual primary packets 38 and 40 in FIG. 1. Each primary packet 38 and 40 may include a plurality of individual polymeric layers alternating between first polymeric material 28 and second polymeric material 30. In some embodiments, packet creator section 34 may include more than two packet creators, such as, for example, three, four, or more than four packet creators, each of which are configured to generate a single primary packet. Accordingly, feedblock 16 is capable of creating multiple primary packets rather than just one primary packet, as described above. In examples in which primary packets 38 and 40 include common polymeric material, first and second packet creators 35 and 37 may be supplied with resin from individual extruders specific to respective packet creators, or a common extruder may supply the like resin to both of packet creators 35 and 37.

Once generated from first material 28 and second material 30 via packet creator section 34, primary packets 38 and 40 may be received by packet combiner 36. As will be described in further detail below, packet combiner 36 may combine primary packets 38 and 40 into a single multilayer stream 32. For example, packet combiner 36 may receive packets 38 and 40 from packet creator section 34 and then redirect the flow of one or both of packets 38 and 40 so that they may be suitably combined into a single multilayer stream 32. Depending on the desired amount of layers in the multilayer film, multilayer stream 32 may be optionally processed by multiplier 18, as shown in FIG. 1, or fed to extrusion die 20 without being processed by multiplier 18.

In some embodiments, packet combiner 36 may combine packets 38 and 40 by reorienting the flow of the respective packets relative to one another other such that at least a portion of the respective primary packets are stacked when combined by combiner 36. If at least a portion of packets 38 and 40 are stacked when combined with one another, then at least a portion of the resulting multilayer stream 32 includes a total number of individual layers approximately equal to that of the sum of the number of individual polymeric layers in packets 38 and 40. An example of a multilayer flow stream resulting from the combination of packets in a substantially fully stacked configuration is further described with respect to FIG. 7.

By combining the packets 38 and 40, the number of individual layers in the stacked portion of multilayer stream 32 created by feedblock 16 may be greater than either of primary packets 38 and 40 individually even without the use of multiplier 18. In some embodiments, if the number of individual polymeric layers in flow stream 32 is suitable for a desired film being manufactured, then film line 10 may not require the use of multiplier 18. Instead, multilayer flow stream 32 may be processed by extrusion die 20 without layer multiplication via multiplier 18. In other cases, the number of times that multilayer flow stream 32 must be processed by multiplier 18 to produce a multilayer flow stream having a desired number of layers is reduced by generating more than one primary packets in feedblock 16 and then combining them into multilayer flow stream 32.

In some examples, multilayer stream 32 may include one or more additional layers besides that of packets 38 and 40. For example, in packet creator section 34, relatively thick protective boundary layers of one or more of the polymers used to form the primary packets 38 and 40 may be added in first packet creator 35 and/or second packet creator 37 to primary packets 38 and 40, and these may later become skin layers in film 46. In another example, one or more skin layers may be added to packet 38 and/or packet 40 within packet combiner 36 prior to the packet 38 and packet 40 being combined. Such skin layer(s) may be added after packet 38 and packet 40 are combined to form multilayer flow stream 32. Additionally or alternatively, a core layer may be added such that the core layer separates packet 38 and packet 40 in multilayer stream 32. Such skin layers may be made of one or both of the same polymers used for the packets 38, 40, or they may be made of different polymers, from additional extruders (not shown).

In some examples, prior to being combined with one another to form multilayer stream 32, one or more of packet 38, packet 40 or any additional layer streams may be spread in the cross-web direction, for example, via spreading manifold. Additionally or alternatively, multilayer stream 32 may be spread in the cross-web after being formed via the combination of packet 38 and packet 40, as well as any other additional layer stream.

Figure 2B:
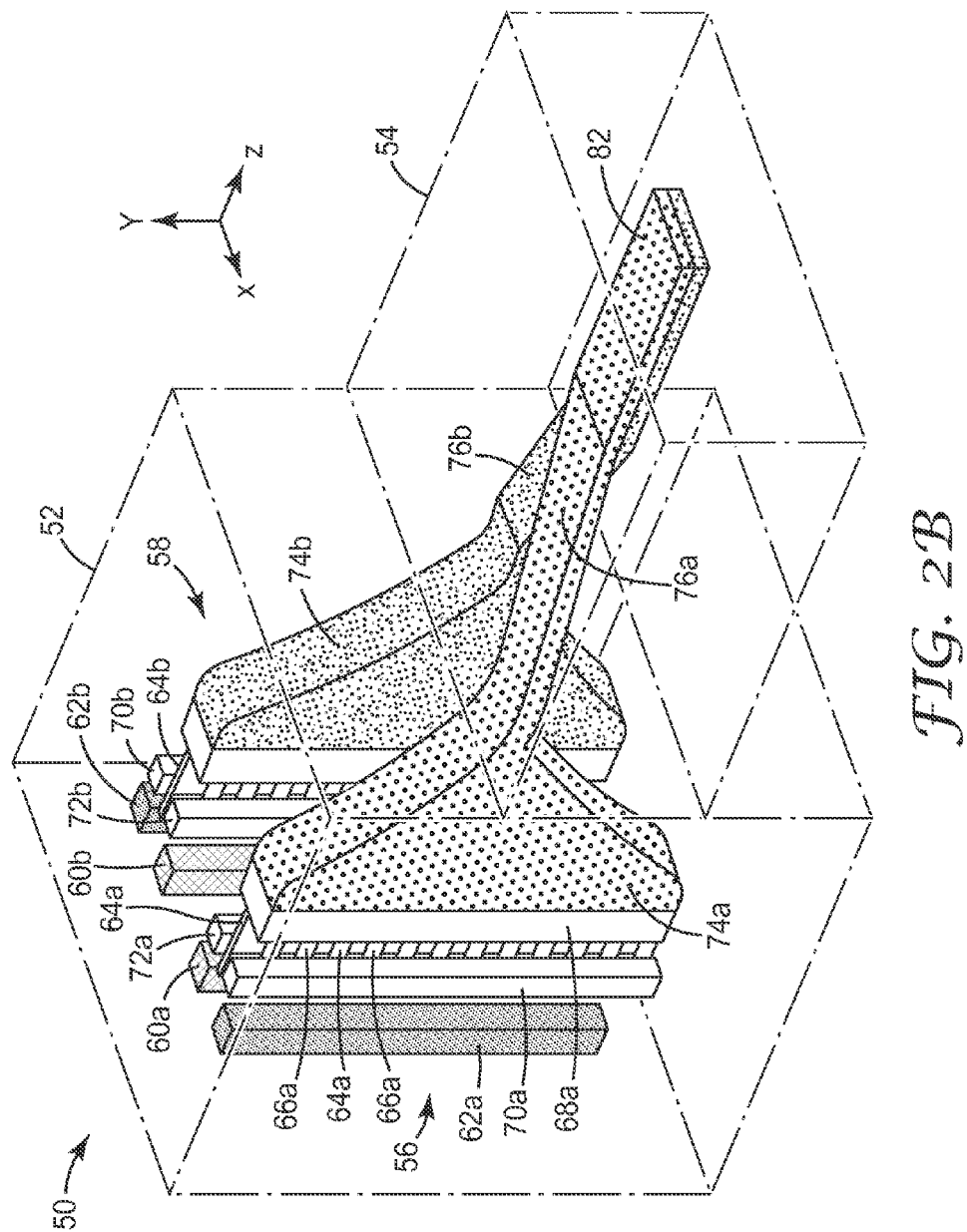

FIGS. 2A and 2B are conceptual diagrams illustrating example feedblock 50. Feedblock 50 may be used as feedblock 16 in a film line configured to manufacture multilayer polymeric films, such as film line 10 of FIG. 1. For example, feedblock 50 may receive polymeric materials from one or more extruders and generate a multilayer flow stream output including the received polymeric materials as individual layers, as previously described. As shown, feedblock 50 includes packet creator section 52 and packet combiner 54, which act in combination to generate the described multilayer flow stream output from the received polymeric materials.

Referring to FIG. 2A, packet creator section 52 includes first packet creator 56 within housing 57, and second packet creator 58 within housing 59. First packet creator 56 and second packet creator 58 are each configured to independently generate a single primary packet. As shown, after first packet creator 56 and second packet creator 58 generate their respective individual primary packets, packet combiner 54 receives each primary packets and combines them into a single multilayer flow stream.

First packet creator 56 includes first flow channel 60a, second flow channel 62a, first plurality of conduits 64a, second plurality of conduits 66a (not shown in FIG. 2A), slot die section 68a, thermal tuning mechanisms 70a and 72a, and compression section 74a. Similarly, second packet creator 58 includes first flow channel 60b, second flow channel 62b, first plurality of conduits 64b, second plurality of conduits 66b (not shown in FIG. 2A), slot die section 68b, thermal tuning mechanisms 70b and 72b, and compression section 74b.

With regard to first packet creator 56, first flow channel 60a and second flow channel 62a are in fluid communication with one or more extruders (not shown) which supply appropriate polymeric materials to the respective flow channels. In the example shown, first flow channel 60a may receive a first polymeric material in the form of resin from a first extruder (not shown) and second flow channel 62a may receive a second polymeric material from a second extruder (not shown).

First flow channel 60a is also in fluid communication with plurality of first conduits 64a, and second flow channel 62a is also in fluid communication with plurality of second conduits 66a. As illustrated in FIG. 2B, plurality of first conduits 64a includes seven individual first conduits and plurality of second conduits 66a includes six individual second conduits. Each of the respective individual conduits may correspond to an individual polymeric layer of the plurality of polymeric layers in the primary packet generated by first packet creator 56. Accordingly, in the example of FIGS. 2A and 2B, first packet creator 56 is configured to generate a primary packet having a total of thirteen individual polymeric layers, with seven of the polymeric layers including the first polymeric material and six of the polymeric layers including the second polymeric material. However, as will be further described below, the number of individual layers of a primary packet generated by a packet creator is not limited to such a number.

Figure 6A:
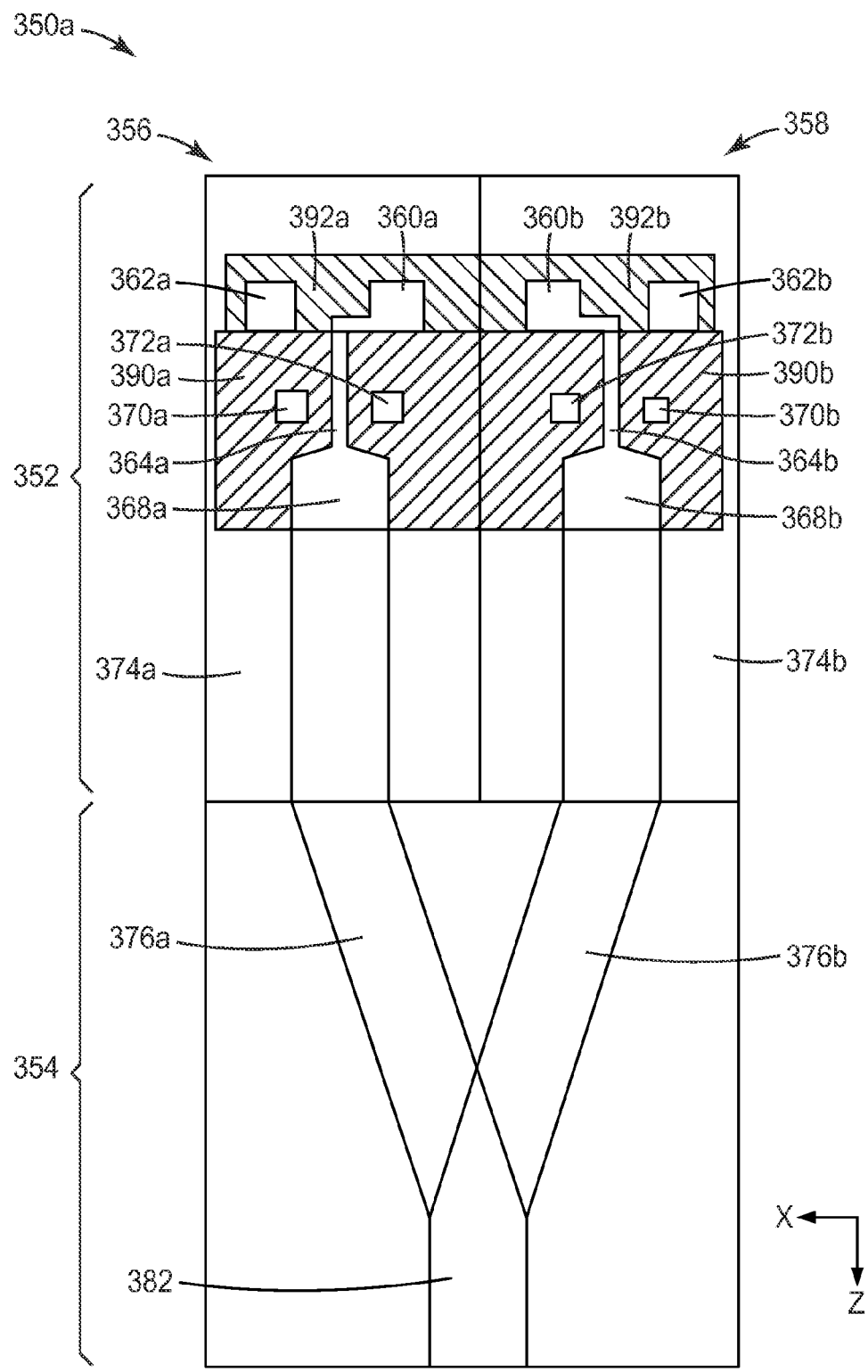
FIGS. 6A-6L are conceptual diagrams illustrating various example feedblock configurations.
Figure 6B:
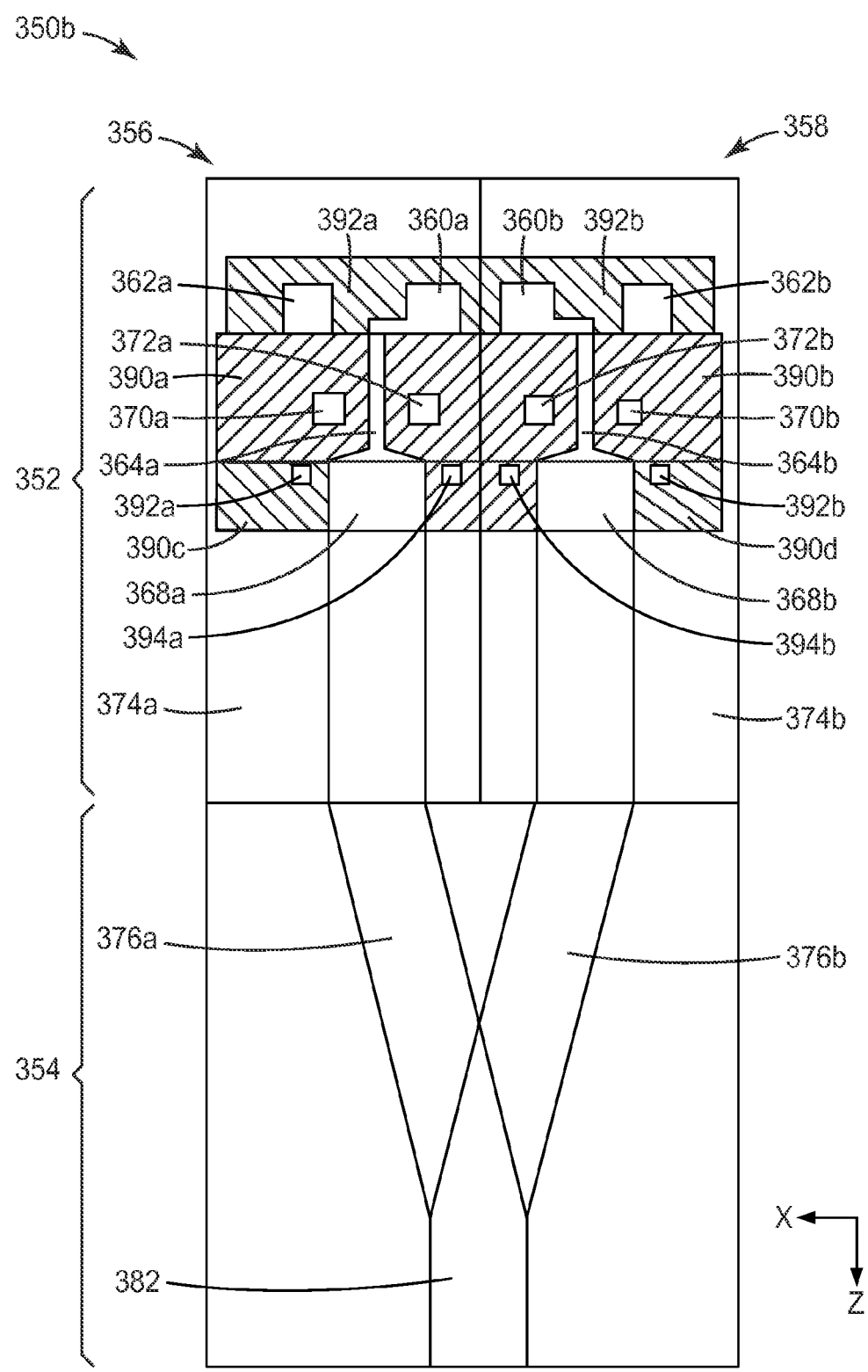
Figure 6C:
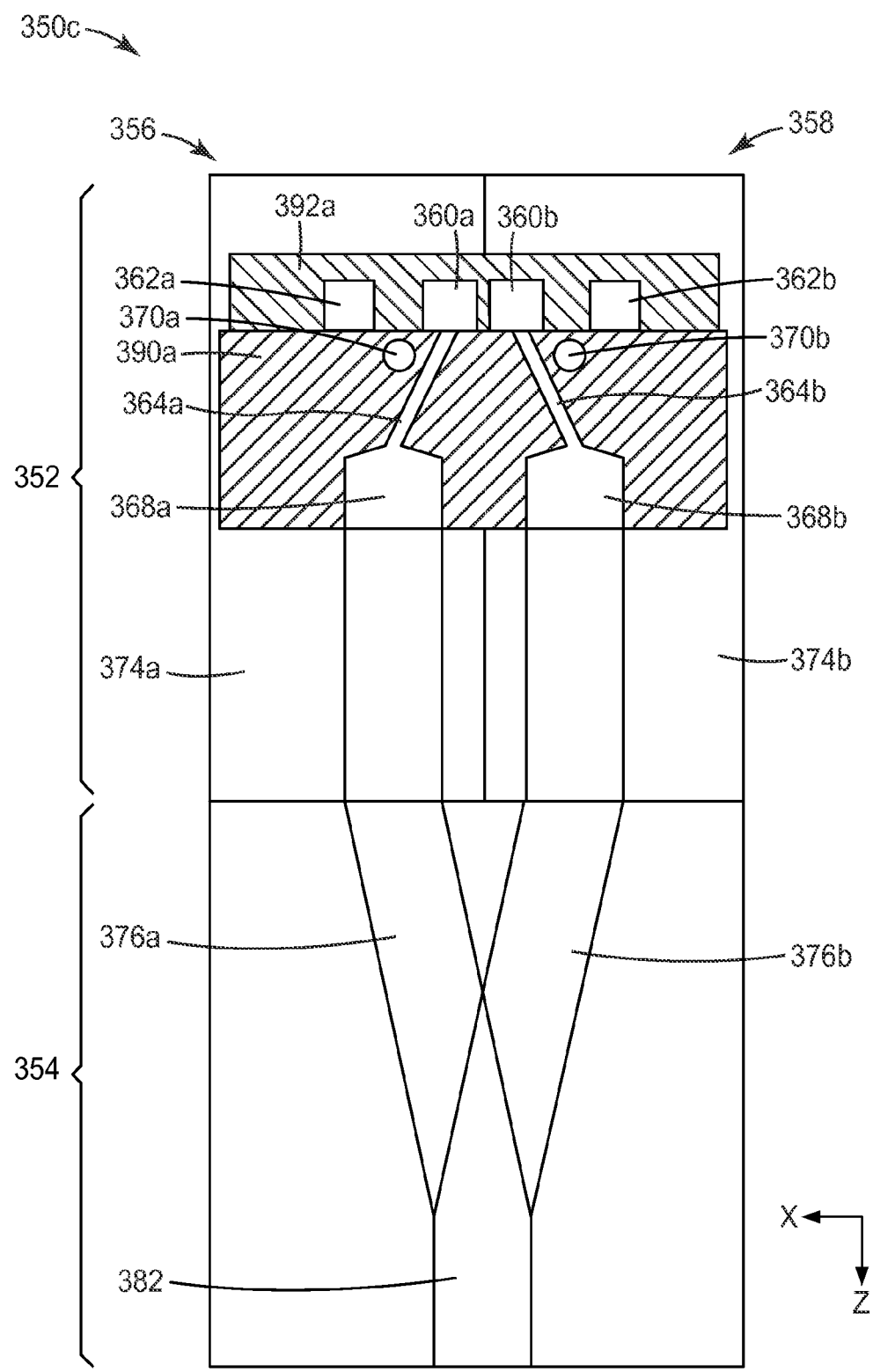
Figure 6D:
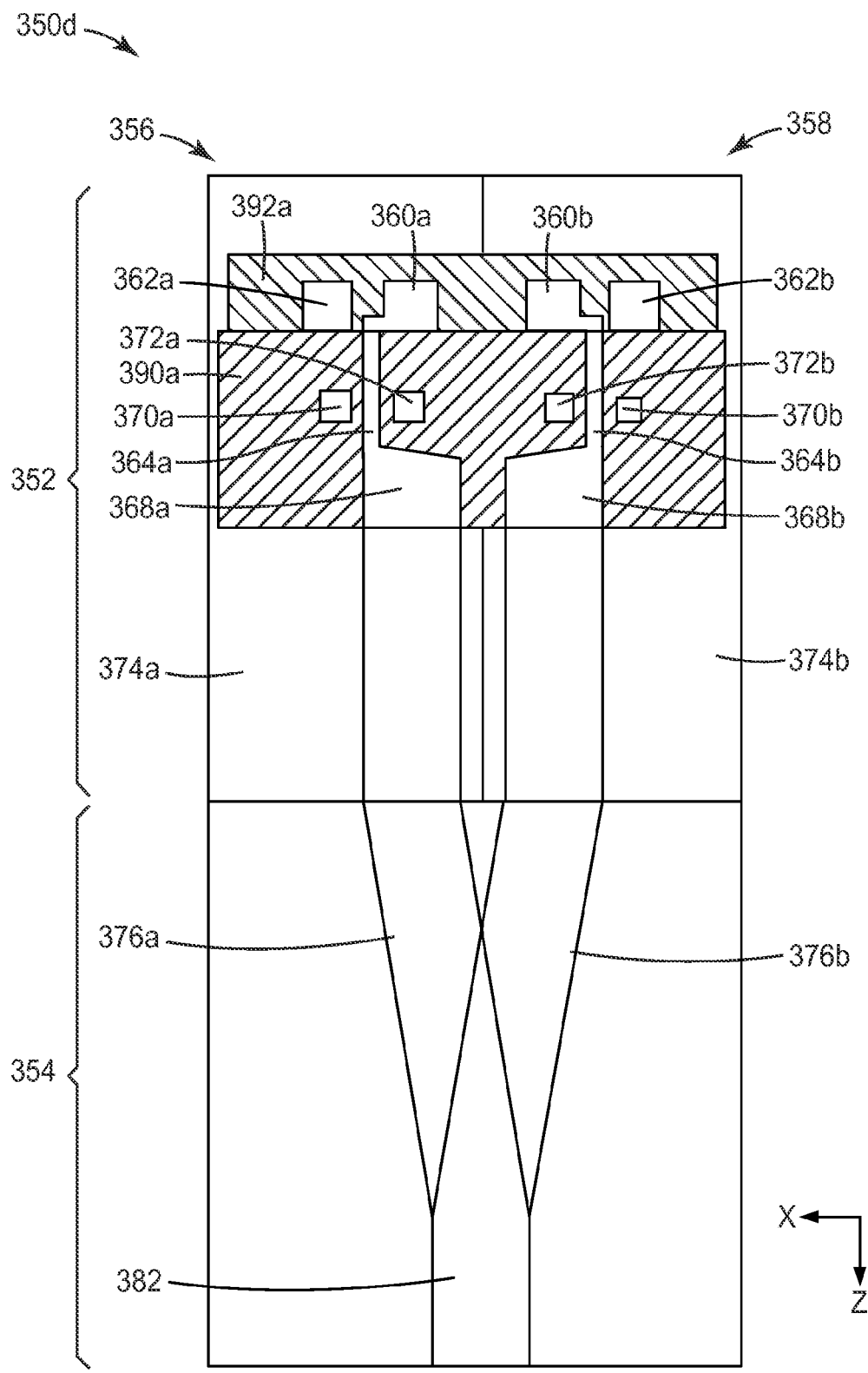
Figure 6E:
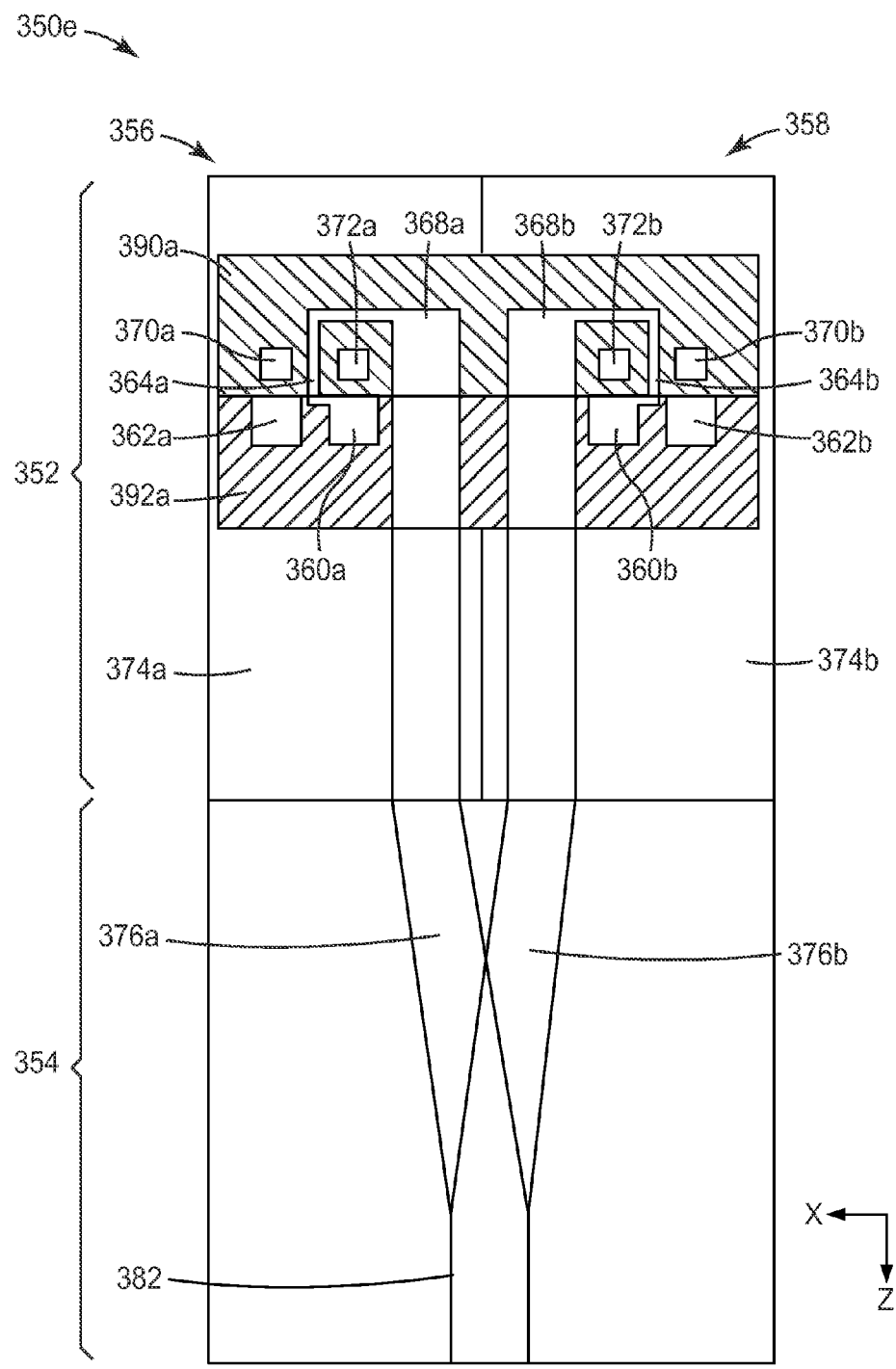
Figure 6F:
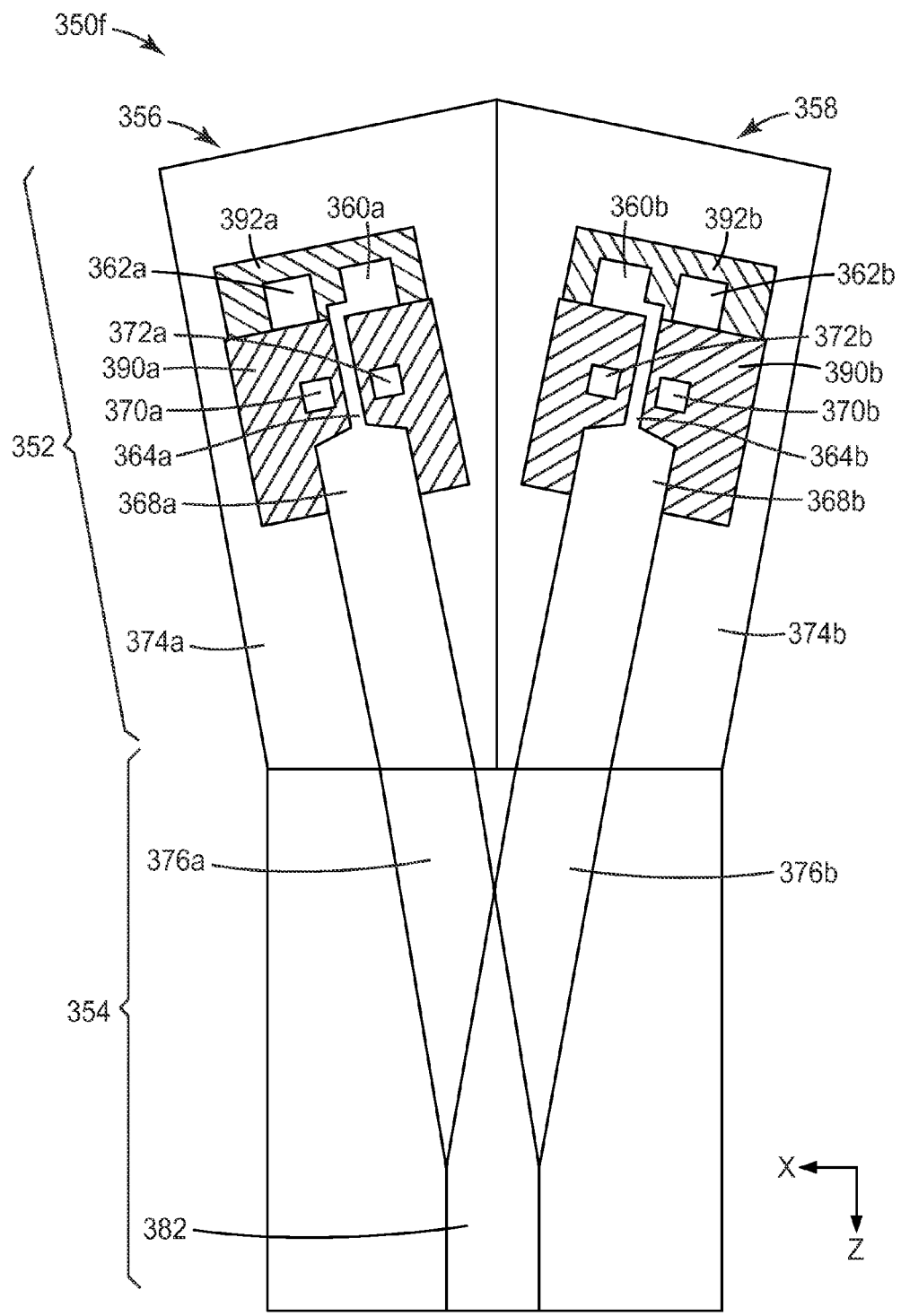
Figure 6G:
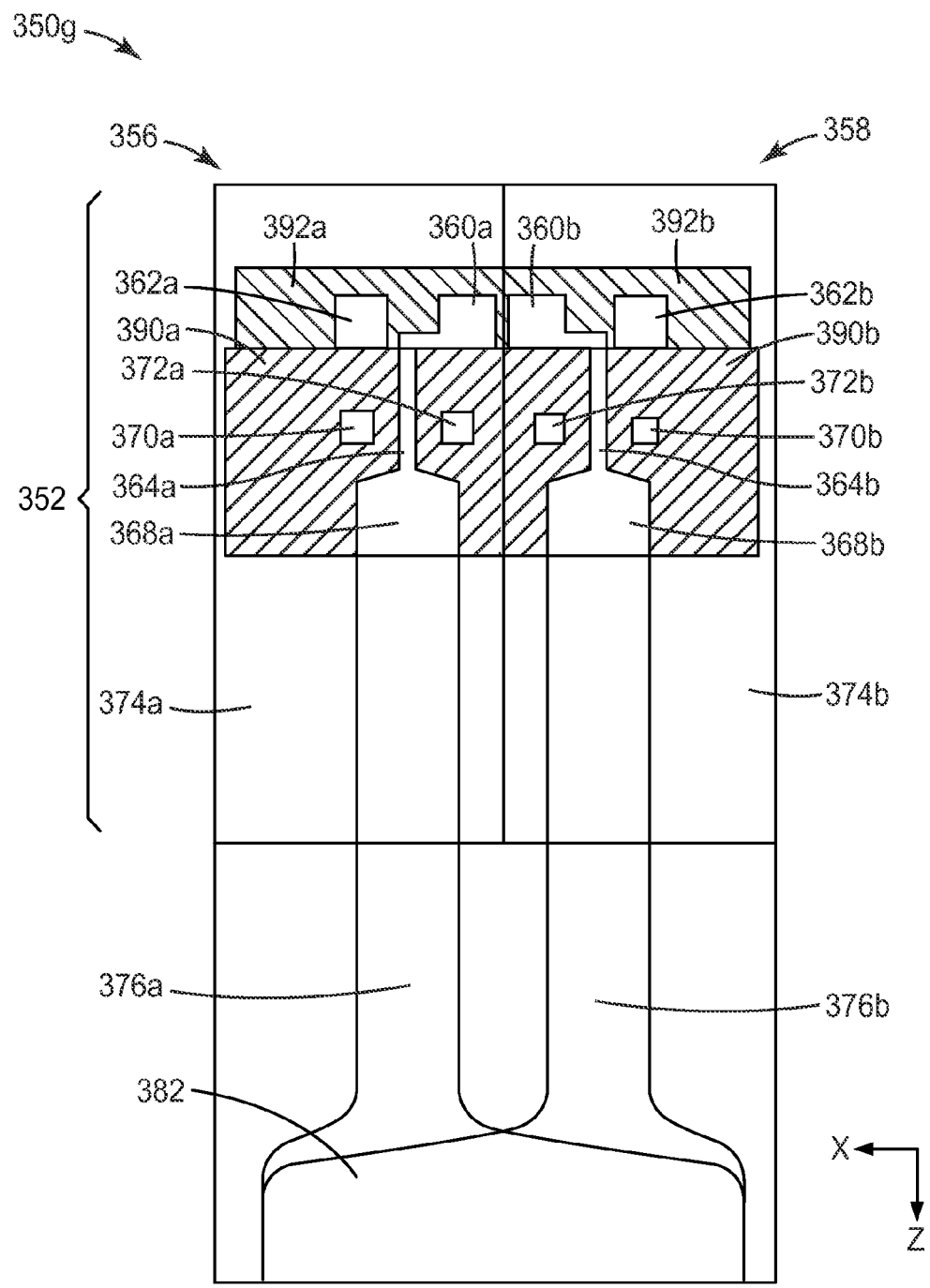
Figure 6H:
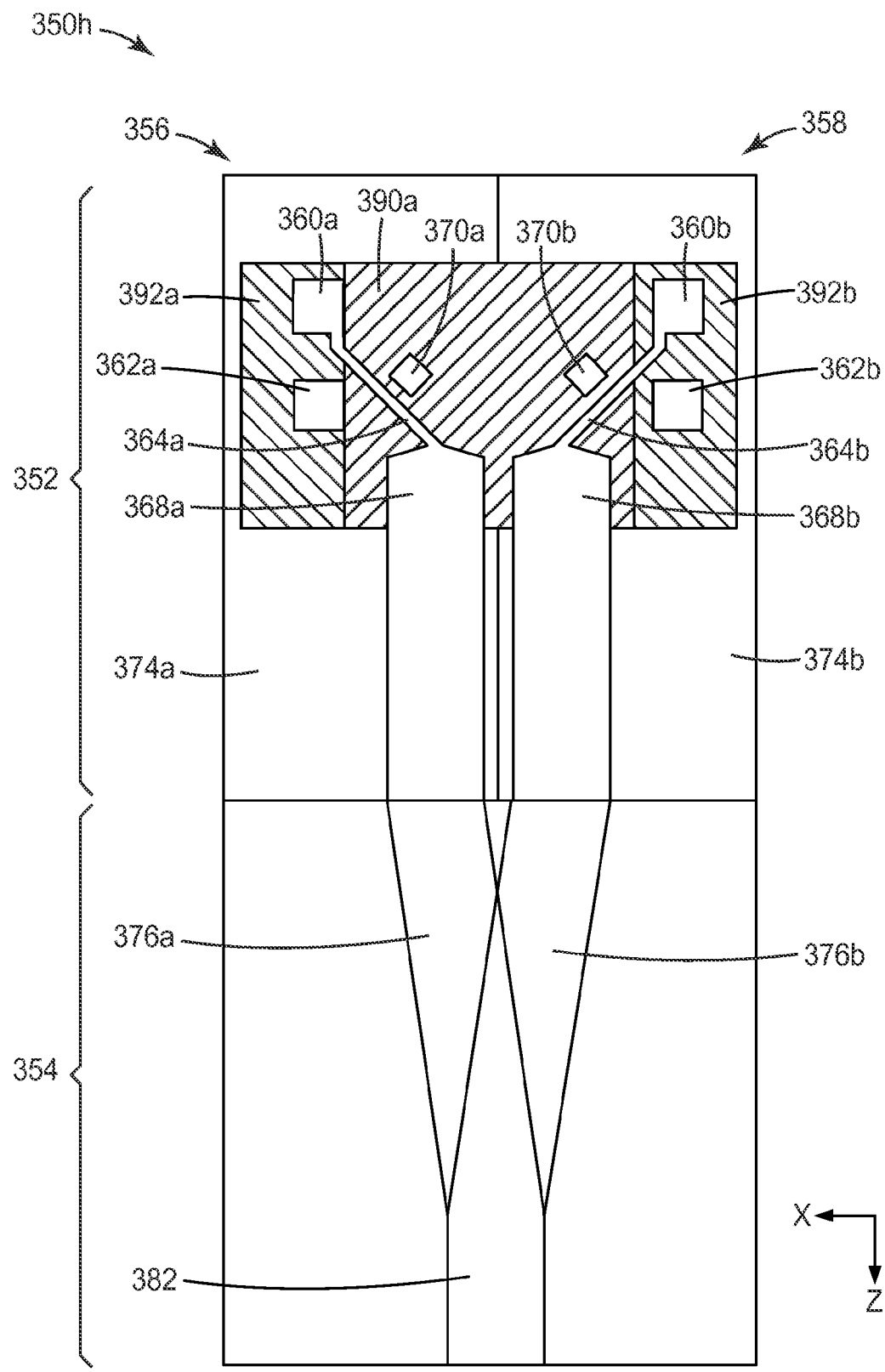
Figure 6I:
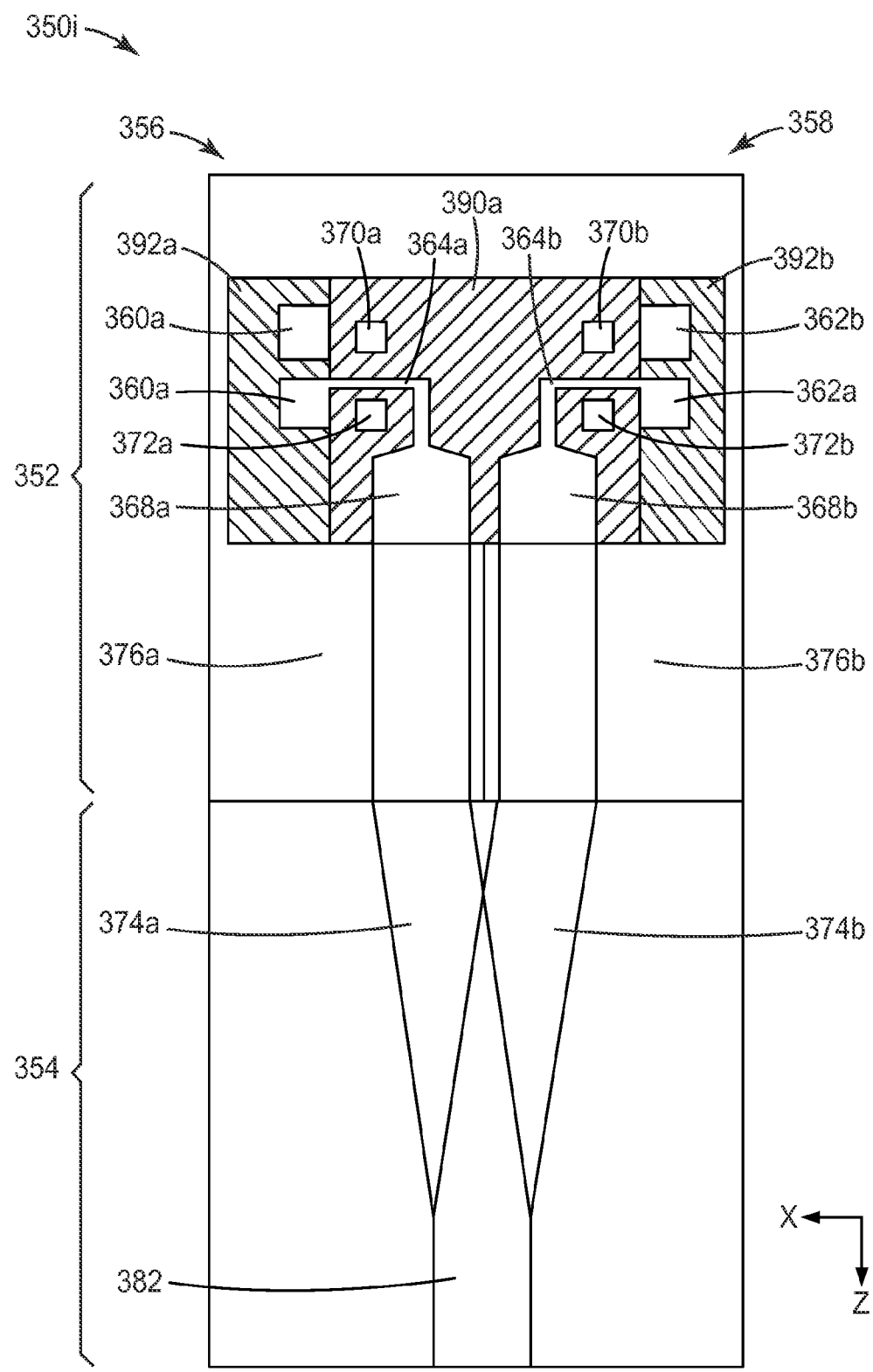
Figure 6J:
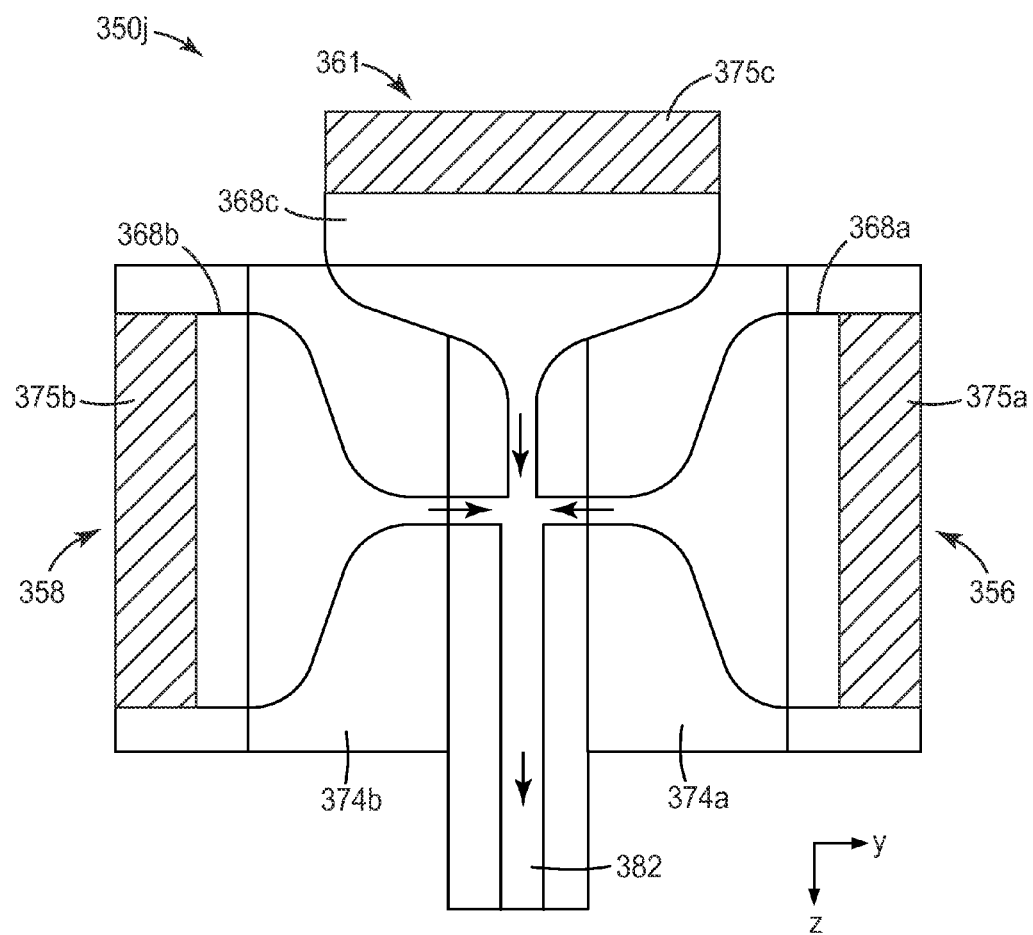
Figure 6K:
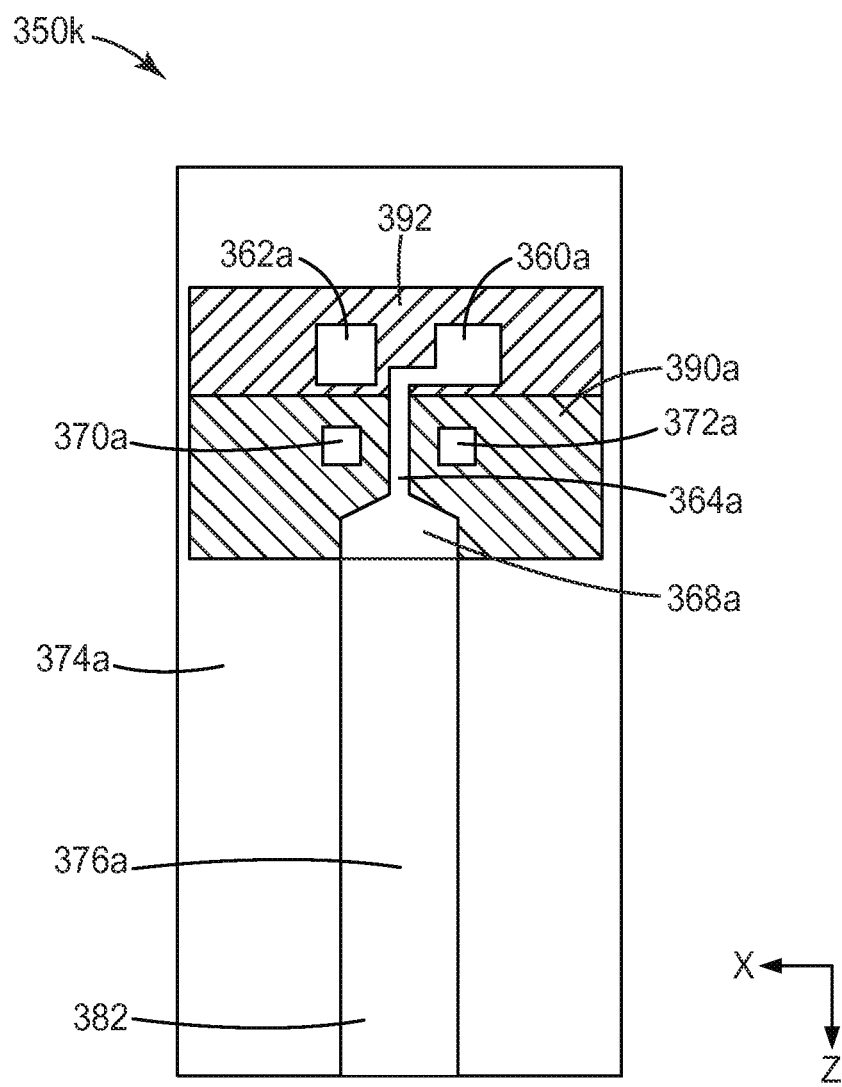

Each of the individual conduits in the plurality of first conduits 64a are in fluid communication with portions of slot die section 68a, and each of the individual conduits in the plurality of second conduits 66a are also in fluid communication with portions of slot die section 68a. Accordingly, the first polymeric material received by first flow channel 60a may be fed to the corresponding portions of slot die section 68a via plurality of first conduits 64a. Likewise, the second polymeric material received by the second flow channel 62a may be fed to the corresponding portions of slot die section 68a via plurality of second conduits 66a. Although plurality of first and second conduits 64a and 66a are shown in FIG. 2A connecting first and second flow channels 60a and 62a to slot die section 68a in a two section, "L" shaped configuration, embodiments are not limited as such. For example, in some embodiments, first and second conduits 64a and 66a may connect first and second flow channels 60a and 62a to slot die section 68a via a single section with a diagonal configuration. Examples exhibiting a diagonal configuration for the first and second flow conduits of first and second packet creator sections are illustrated in FIGS. 6C and 6H, which will be described further below.

In some embodiments, the geometry of the respective flow channels 60a and 62a may be designed to influence the layer thickness distribution of the primary packet generated by first packet creator 56. For example, the cross-sectional area of flow channels 60a and 62a may remain constant or can change, for example, increase or decrease in area, to provide an appropriate pressure gradient, and the pressure gradient provided by the cross-sectional area of flow channels 60a and 62a may affect the layer thickness distribution of the primary packet generated by first packet creator 56.

Optionally, residing proximate to plurality of conduits 64a and 66a are thermal tuning mechanisms 70a and 72a. In the example shown, thermal tuning mechanisms 70a and 72a include one or more axial rod heaters that are used to selectively provide heat to the polymeric material flowing in plurality of conduits 64a and 66a. If desired, temperature can be varied in zones along the length of the axial rod heater. In this manner, the flow rate of a polymeric material through one or more conduits of plurality of conduits 64a and 66a can be adjusted according to the amount of heat being provided by thermal tuning mechanisms 70a and 72a, thereby influencing the thickness of individual layers in the primary packet generated by first packet creator 56.

Slot die section 68a is configured to receive the first and second polymeric materials from plurality of first conduits 64a and plurality of second conduits 66a, respectively. In some embodiments, the individual layers of the primary packet may be formed within slot die section 68a. Slot die section 68a may include an expansion manifold section configured to receive the polymeric material from the respective plurality of conduits 64a and 66a and spread the polymeric material in the width direction (x-direction) of slot die section 68a to approximately the desired packet width. Slot die section 68a also may include a slot section that receives the polymeric material from the expansion manifold section, and further assists in forming the individual polymeric layers from that polymeric material. By the time the polymeric materials exit slot die section 68a, the individual layers that make up the plurality of layers of the first primary packet generated by first packet creator 56 are substantially formed, with the major plane of the layers extending in approximately the cross-web direction (x-direction), that is, the layers are stacked in approximately the y-direction as indicated in FIG. 2B.

As illustrated in FIG. 2B, the individual conduits of the plurality of first conduits 64a are interleaved along the depth (in the y-direction) of slot die section 68a with the individual conduits of the plurality of second conduits 66a. As a result, the primary packet generated by first packet creator 56 is formed such that the individual layers substantially alternate between first and second polymers. In some cases, by alternating polymer layers, for example, especially between high and low index polymer layers, a film may exhibit one or more desirable optical properties. While the thirteen individual polymeric layers formed by first packet creator 56 alternate in an A/B/A/B pattern, embodiments are not limited as such. For example, in some embodiments, first packet creator 56 may be configured according to other patterns such as A/B/B/A, A/A/A/B/B/B, A/B/B/B/A, and the like. In cases in which adjacent slots in slot die section 68a are fed similar materials, this may result in a single polymeric layer rather than two individual layers, which may have greater thickness than a polymeric layer formed via only a single slot fed by a single conduit. Accordingly, the primary packet created by first packet creator 56 is not limited to generating a primary packet having thirteen alternating polymeric layers. In this manner, first packet creator 56 provides for great flexibility in properties and composition of the corresponding primary packet that it creates. Moreover, as first and/or second packet creator 56 and 58 may be configured to generate primary packets having more than two types of polymer layers, patterns other than described above are contemplated. For example, in the case of a primary packet having three different types of polymeric layers, first and/or second packet creator 56 and 58 may be configured to generate a primary packet having the pattern A/B/C or A/C/B, as well as any other possible combinations of the three different types of polymeric layers.

Upon exiting slot die section 68a, the multilayer polymeric stream corresponding to the first primary packet may be fed into compression section 74a where the layers of the primary packet are compressed in the transverse direction (y-direction) to decrease the thickness of the primary packet. After being compressed in the compression section 74a, the primary packet generated by first packet creator 56 is fed to packet combiner 54, which combines the primary packet generated by first packet creator 56 with the primary packet generated by second packet creator 58.

As previously described, second packet creator 58 includes first flow channel 60b, second flow channel 62b, first plurality of conduits 64b, second plurality of conduits 66b (not shown in FIG. 2A), slot die section 68b, thermal tuning mechanisms 70b and 72b, and compression section 74b. Each of these features may be configured substantially the same or similar to that described with respect to the similarly numbered and named feature of first packet creator 56. Accordingly, second packet creator 58 may be configured to generate a primary packet according to substantially the same or similar process described with respect to the generation of a primary packet by first packet creator 56. Once the multilayer polymeric stream corresponding to the primary packet generated by second packet creator 58 is compressed in compression section 74b, the primary packet is fed to packet combiner 54 along with that of the primary packet from first packet creator 56.

Packet combiner 54 includes first channel 76a and second channel 76b defined by packet combiner housing 78. First channel 76a is in fluid communication with compression section 74a and may receive the multilayer polymeric stream corresponding to the primary packet generate by first packet creator 56 via inlet 80a. Similarly, second channel 76b is in fluid communication with compression section 74b and may receive the multilayer polymeric stream corresponding to the primary packet generated by second packet creator 58 via inlet 80b.

Packet combiner 54 may be configured to combine the first primary packet and the second primary packet with one another to form a single multilayer stream, generally represented in FIGS. 2A and 2B by numeral 82. For example, as shown in FIGS. 2A and 2B, first channel 76a and second channel 76b may be configured relative to one another such that the multilayer flow streams corresponding to primary packets received via inlets 80a and 80b, respectively, are reoriented within packet combiner 54 from the original relative position that the primary packets were received by packet combiner 54 and then combined into a single multilayer flow stream 82. In particular, first and second channels 76a and 76b may reorient the respective primary packets such that at least a portion of the packets are stacked relative to one another when the respective packets are combined. For example, when the respective primary packets have been reoriented to be suitably stacked, outermost surfaces of the packets may be brought into contact with one another to combine the respective primary packets into a single flow multilayer flow stream 82 via melt lamination.

In this manner, by combining the primary packets as described, multilayer flow stream 82 may include at least a portion of the primary packet generated by first packet creator 56 and at least a portion of the second packet generated by second packet creator 58 in a stacked configuration. Accordingly, the number of individual layers possessed by at least a portion of multilayer flow stream 82 is approximately equal to that of the sum of the number of individual polymeric layers in the respective primary packets generated by first and second packet creators 56 and 58. For example, multilayer flow stream 82 may include a total of twenty-six individual layers in the example of FIGS. 2A and 2B, assuming that the primary packet generated by first packet creator 56 and the primary packet generated by second packet creator 58 each have a total of thirteen individual polymeric layers. However, in some cases, if the outer layers of each respective primary packet that are brought into contact with one another when the primary packets are combined are formed of substantially the same polymeric material, the two outer layers may combine together to effectively form a single polymeric layer in the multilayer flow stream 82. In such cases, multilayer flow stream 82 may include a total of twenty-five individual layers. The total number of layers in such cases may generally be described by the formula $x+y-1$, where x equals the number of layers in the primary packet generated by the first packet creator and y equals the number of layers in the primary packet generated by the second packet creator.

In some embodiments, the flow geometry of one or more portions of packet combiner 54, for example, channels 76a and 76b, may be designed to achieve uniform spreading of the respective primary packets in the cross-web direction (x-direction), in addition to reorienting the respective packets such that at least a portion of the primary packets are stacked when combined with one another. For example, first channel 76a and/or second channel 76b may be designed to spread a received primary packet in the cross-web direction. As will be described further below, in some examples, first channel 76a and second channel 76b may be configured to spread the respective packets in the cross-web direction prior to combining the flow streams of the respective packets to form multilayer flow stream 82.

Still referring to FIGS. 2A and 2B, the multilayer flow stream 82 resulting from the combination of the received primary packets exits packet combiner 54 via outlet 84. Depending on the number of individual layers desired for the manufactured multilayer polymeric film, multilayer flow stream 82 may or may not undergo further processing to increase the number of layers of flow stream 82 before being processed via an extrusion die. For example, if the number of polymeric layers in multilayer flow stream 82, that is, a number substantially equal to that of the sum of the layers in the first and second primary packets, is suitable for the desired multilayer film, then multilayer flow stream 82 may be fed to an extrusion die without layer multiplication by a multiplier device. To the extent required, flow stream 82 may be spread in the cross-web direction by a spreading manifold within the extrusion die. In some example, the primary packet generated by first and second packet creators 56, 58 may be separately fed into an extrusion die and then spread in the cross-web direction via spreading manifold prior to being combined with one another to form multilayer stream 82.

Alternatively, in some embodiments, multilayer flow stream 82 may be processed by a multiplier to increase the number of layers in the polymeric flow stream that is processed by an extrusion die, for example, if the number of layers in multilayer flow stream 82 is less than the layers desired for the multilayer film being manufactured. However, for at least the reasons previously identified with respect to layer multiplication by a multiplier device, in some embodiments, it may be desirable to configure first and second packet creators 56 and 58 such that the number of layers in resulting multilayer flow stream 82 provides for a suitable number of layers without further layer multiplication. In such cases, one or more of the problems associated with the use of a multiplier device previously identified may be avoided.

While the embodiment of FIGS. 2A and 2B illustrates first and second packet creators 56 and 58 as being configured to generate primary packets having thirteen individual polymeric layers, embodiments are not limited to such a configuration. Instead, in some embodiments, a packet creator may be configured to generate a primary packet including more or less than thirteen individual polymeric layers. For example, in some embodiments, packet creator 56 and/or 58 may be configured to generate a primary packet having at least four individual polymeric layers. In some embodiments, first packet creator 56 and/or second packet creator 58 may be configured such that the number of individual polymeric layers in the primary packet generated by the respective packet creator may be at least 4 individual layers, such as, for example, at least 20 individual layers, at least 50 individual layers, at least 125 individual layers, or at least 300 individual layers. In some examples, first packet creator 56 and/or second packet creator 58 may be configured such that the number of individual polymeric layers in the primary packet generated by the respective packet creator ranges from approximately 50 polymeric layers to approximately 1000 polymeric layers, such as, for example, approximately 100 polymeric layers to approximately 500 polymeric layers. In some examples, first and second packet creators 56 and 58 may be configured to generated primary packets having substantially the same number of individual polymeric layers. In other examples, the number of individual layers in the primary packets generated by first packet creator 56 may be different than that of the number of individual layers in the primary packet generated by second packet creator 58. In any case, such primary packets may be stacked and combined as described in this disclosure, for example, to create a multilayer flow stream that has layers in a number approximately equal to the sum of the number of layers of each primary packet. Feedblock 50 is not limited embodiments including only two packet creator sections, but may include more than two packet creator sections, such as, for example, three packet creators or four packet creators, in some embodiments. Each of the individual packet creators may generate a separate primary packet in accordance with this disclosure.

Substantially all design parameters of the flow defining sections in first packet creators 56, for example, flow channels 60a and 62a, conduits 64a and 66a, and slot die section 68a, may be independent from the flow defining sections in second packet creator 58, for example, flow channels 60b and 62b, conduits 64b and 66b, and slot die section 68b. Parameters such as slot gap height, slot length, conduit diameter, channel widths used in first packet creator 56 may be selected without effecting the selection of similar parameters in second packet creator 58. This may allow for significant flexibility in the design and/or machining of the flow defining sections of the respective packet creators in feedblock 50.

Moreover, as shown in FIGS. 2A and 2B, in some embodiments, feedblock 50 may be configured such that one or more properties of the primary packet generated by first packet creator 56 may be substantially independent from that of the primary packet generated by second packet creator 58, and vice versa. For example, feedblock 50 may be configured such that the number of polymeric layers in the primary packet generated by first packet creator 56 may be substantially independent from the number of polymeric layers in the primary packet generated by second packet creator 58, and vice versa. As configured in FIGS. 2A and 2B, the number of layers in the primary packet generated by first packet creator 56 may be primarily dependent on the configuration of slot die section 68a and number of individual conduits of plurality of first and second conduits 64a and 66a feeding slot die section 68a. Similarly, the number of layers in the primary packet generated by second packet creator 58 may be primarily dependent on the configuration of slot die section 68b and number of individual conduits of plurality of first and second conduits 64b and 66b feeding slot die section 68b.

In each case, the number of individual layers possessed by the first primary packet and the number of individual layers possessed by the second primary packet is dependent primarily on components of the respective packet creator generating the primary packet, rather than one or more aspects of the other packet creator in feedblock 50. As one result, feedblock 50 may allow for greater flexibility in the overall range of individual layers possessed by multilayer stream 82 and, accordingly, the multilayer film manufactured from stream 82, since the number of layers in respective primary packets are substantially independent of one another.

As another example, in some embodiments, the composition of the polymeric layers of the primary packet generated by first packet creator 56 and the composition of the polymeric layers of the primary packet generated second packet creator 58 may be independent of one another. As shown in FIGS. 2A and 2B, first flow channel 60b and second flow channel 62b of second packet creator 58 may be separate and distinct from that of first and second flow channels 60a and 62a of first packet creator 56. Accordingly, the polymeric materials fed into first and second flow channels 60b and 62b may be different than that of the polymeric material fed into first and second flow channels 60a and 60b.

In this manner, the polymeric materials that make up the individual layers of the primary packet generated by second packet creator 58 may be independent from that of the polymeric materials that make up the individual layers of the primary packet generated by first packet creator 56. As a result, in some cases, feedblock 50 may be capable of producing a multilayer stream 82 that includes four individual layers each with distinct compositions, for example, when packet creator 56 generates a primary packet from polymeric A and polymeric B, and packet creator 58 generates a primary packet from polymeric C and polymeric D. Since each of polymers A-D may possess unique properties, for example, refractive index values and/or potential for birefringence when stretched, feedblock 50 may provide for a greater ability to tailor the properties possessed by the manufactured multilayer film compared to that of a feedblock configured to generate a multilayer flow stream having only two different polymeric layers. Although the individual polymeric layers of primary packets may be described herein as including only a single polymeric material, it is recognized that in some embodiments, the individual polymeric layers may include a mixture of two or more suitable materials, rather than only a single polymeric material.

As another example, in some embodiments, feedblock 50 may be configured such that the layer thickness profiles of the primary packet generated by first packet creator 56 and the primary packet generated by second packet creator 58 are substantially independent from one another. As configured in FIGS. 2A and 2B, for example, the components of first packet creator 56 that influence the layer thickness profile of the primary packet generated by first packet creator 56 (for example, slot die section 68a, first and second plurality of conduits 64a and 66a, and first and second flow channels 60a and 62a) are substantially separate and distinct from that of the corresponding components of second packet creator 58. Likewise, the components of second packet creator 58 that influence the layer thickness profile of the primary packet generated by second packet creator 58 (for example, slot die section 68b, first and second plurality of conduits 64b and 66b, and first and second flow channels 60b and 62b) are substantially separate and distinct from that of the corresponding components of first packet creator 56. As a result, first packet creator 56 and second packet creator 58 may be able to generate separated primary packets having layer thickness profiles substantially independent from one another.

Furthermore, not only may the layer thickness profiles of the respective primary packets generated by packet creators 56 and 58 be independent of one another, the layer thickness profiles of the respective primary packets may also be controlled or "tuned" independently of one another. For example, in FIGS. 2A and 2B, tuning mechanisms 70a and 72a of first packet creator 56 are substantially separate from that of tuning mechanisms 70b and 72b of second packet creator 58. As previously described, tuning mechanisms 70a and 72a may selectively provide heat to the polymeric materials flowing in plurality of conduits 64a and 66a, and tuning mechanisms 70b and 72b may selectively provide heat to the polymeric materials flowing in plurality of conduits 64b and 66b. In such a configuration, tuning mechanisms 70a and 72a may selectively provide heat to control or "tune" the layer thickness profile of the primary packet generated by first packet creator 56 as described without substantially influencing the layer thickness profile of the primary packet generated by second packet creator 58, for example, by minimizing or preventing "cross-talk" between the packets when tuning is required, and vice versa. In some embodiments, first packet creator 56 and second packet creator 58 may be substantially thermally isolated from one another. As illustrated in FIG. 2A, feedblock 50 may include isolation section 86 provided between first packet creator housing 57 and second packet creator housing 59. Isolation section 86 may provide substantial thermal isolation between first and second packet creators 56 and 58. In some embodiments, isolation section 86 may simply be a physical void space between first packet creator housing 57 and second packet creator housing 59. However, in other embodiments, isolation section 86 may include one or more materials that provide appropriate thermal isolation between first and second packet creators 56 and 58, as described. In any case, the composition (or lack of in embodiments in which section 86 is a physical void space) and/or the relative dimensions of isolation section 86 may be designed to provide the appropriate amount of thermal isolation between first and second packet creators 56 and 58 such that the layer thickness profiles of the primary packets generated by the respective packets creators may be control or "tuned" substantially independently of one another due at least in part to the relative thermal isolation provided by isolation section 86. Furthermore, using separate packet creators, the temperatures of the input polymers for each primary packet generated in feedblock 50 may differ between the respective packet creators. Similarly, the temperatures of each packet creator and the flow within the packet creators may be different between the respective packet creators.

As configured, the ratio of thicknesses between the primary packet generated by first packet creator 56 and the primary packet generated by second packet creator 58, that is, the multiplication ratio, may be determined by the mass flow rate of material supplied to each respective packet creator, for example, rather than by the flow resistance of the channel geometry of a layer multiplier device, as previously described. As a result, the multiplication ratio can be directly adjusted during a run to compensate for material property variations or deviations of process conditions from assumptions made during the original design.

Figure 3A:
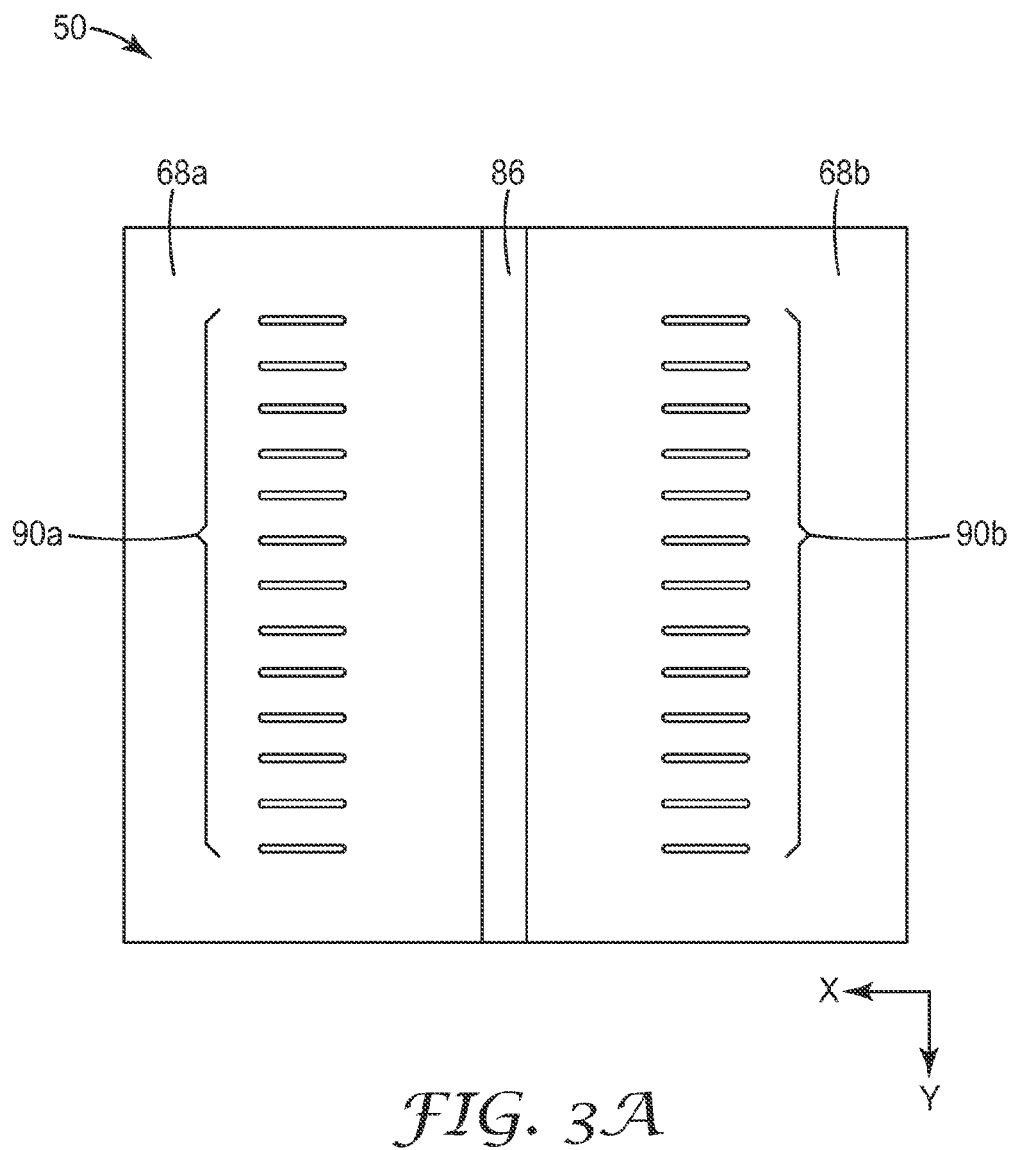
FIGS. 3A-C are example cross-sectional views illustrating feedblock 50 along line A-A in FIG. 2A.

FIG. 3A is an example cross-sectional view illustrating feedblock 50 along line A-A in FIG. 2A. In particular, FIG. 3A illustrates slot die sections 68a and 68b of feedblock 50, which are separated by isolation section 86. As previously described, isolation section 86 may provide substantial thermal isolation between first and second packet creators 56 and 58.

As shown, slot die sections 68a and 68b each include a plurality of slots 90a and 90b, respectively, which correspond to the plurality of individual polymeric layers in the primary packet generated by the corresponding packet creator. The layer thickness profile of the primary packet generated by first packet creator 56 may depend on the relative geometry of plurality of slots 90a within slot die section 68a. Likewise, the layer thickness profile of the primary packet generated by second packet creator 58 may depend on the relative geometry of plurality of slots 90b within slot die section 68b. As previously described, physically separating slot die sections 68a and 68b may assist in providing substantial thermal isolation between first and second packet creators 56 and 58, allowing for independent control or "tuning" of each individual primary packet, as previously described.

Figure 3B:
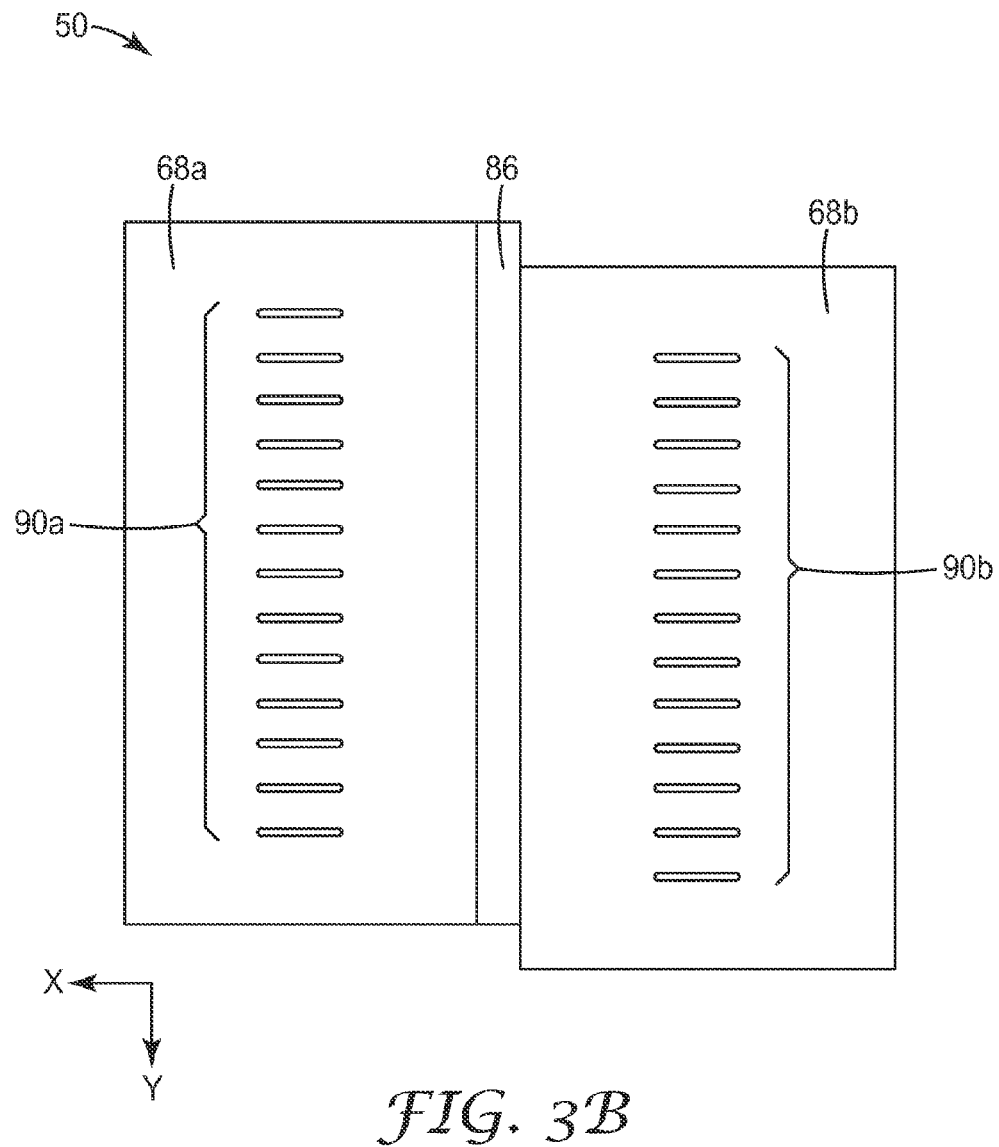
Figure 3C:
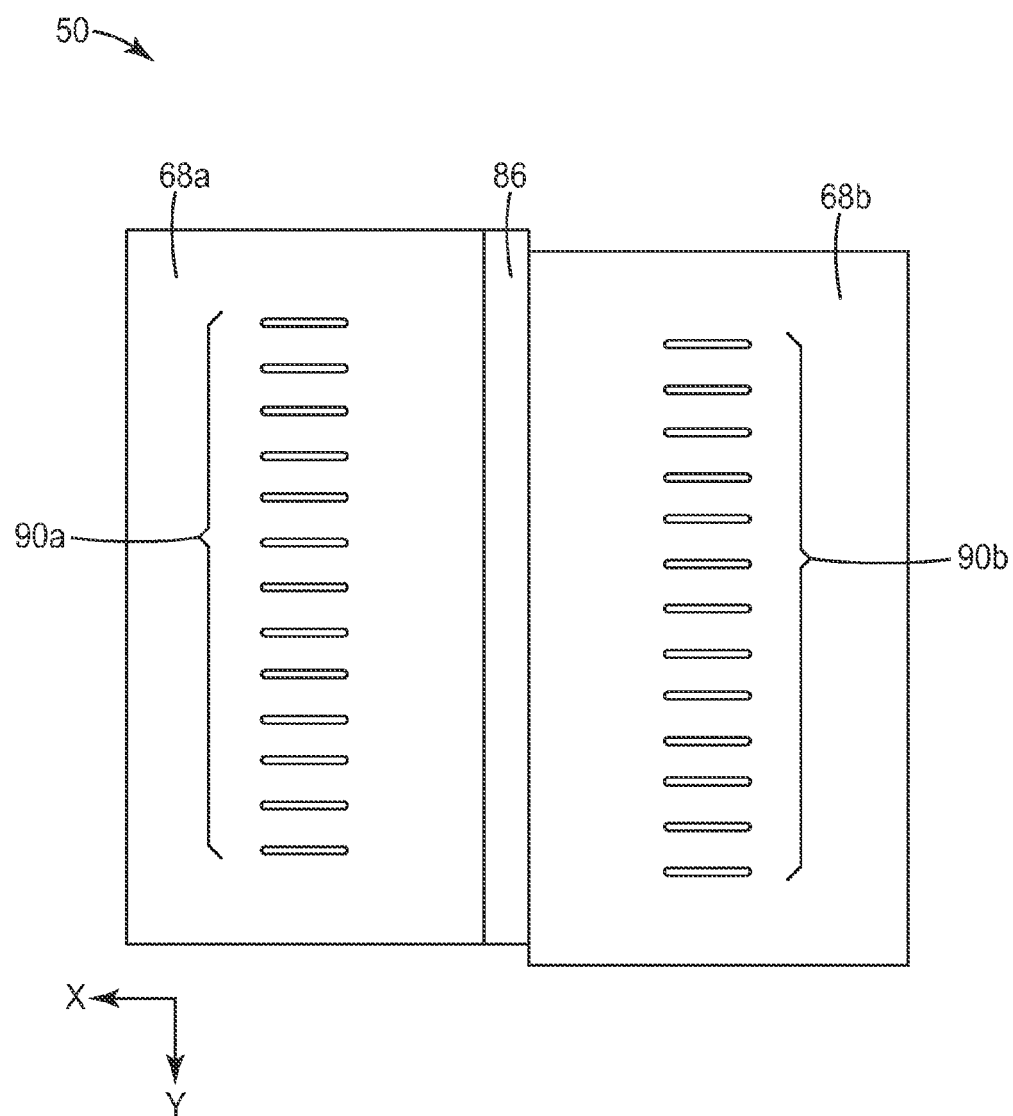

FIGS. 3B and 3C illustrate alternate example cross-sectional views illustrating feedblock 50 along A-A. The examples shown in FIGS. 3B and 3C are substantially similar to that shown in FIG. 3A. However, in FIG. 3A, plurality of slots 90a within slot die section 68a are aligned in the transverse direction (y-direction) with plurality of slots 90b within slot die section 68a. In FIG. 3B, plurality of slot 90a within slot die section 68a are aligned in the transverse direction (y-direction) with plurality of slots 90b within slot die section 68a but are offset relative to one another in the y-direction. In such a configuration, each individual slot within slot die sections 68a and 68b has a slot directly across from the respective slot in the adjacent slot die section except for the top slot of plurality of slots 90a and the bottom slot of plurality of slots 90b. In FIG. 3C, plurality of slots 90a and plurality of slots 90b are offset from one another by approximately half of that shown in FIG. 3B. If such a configuration, the plurality of slots 90a are in essence interleaved with plurality of slots 90b rather than being aligned with each other in the transverse (y-direction). As illustrated by FIGS. 3A-3C, slot die sections 68a and 68b may or may not be oriented such that plurality of slots 90a and 90b are offset from one another, and may be aligned with one another or may be interleaved with one another in the y-direction.

Figure 4A:
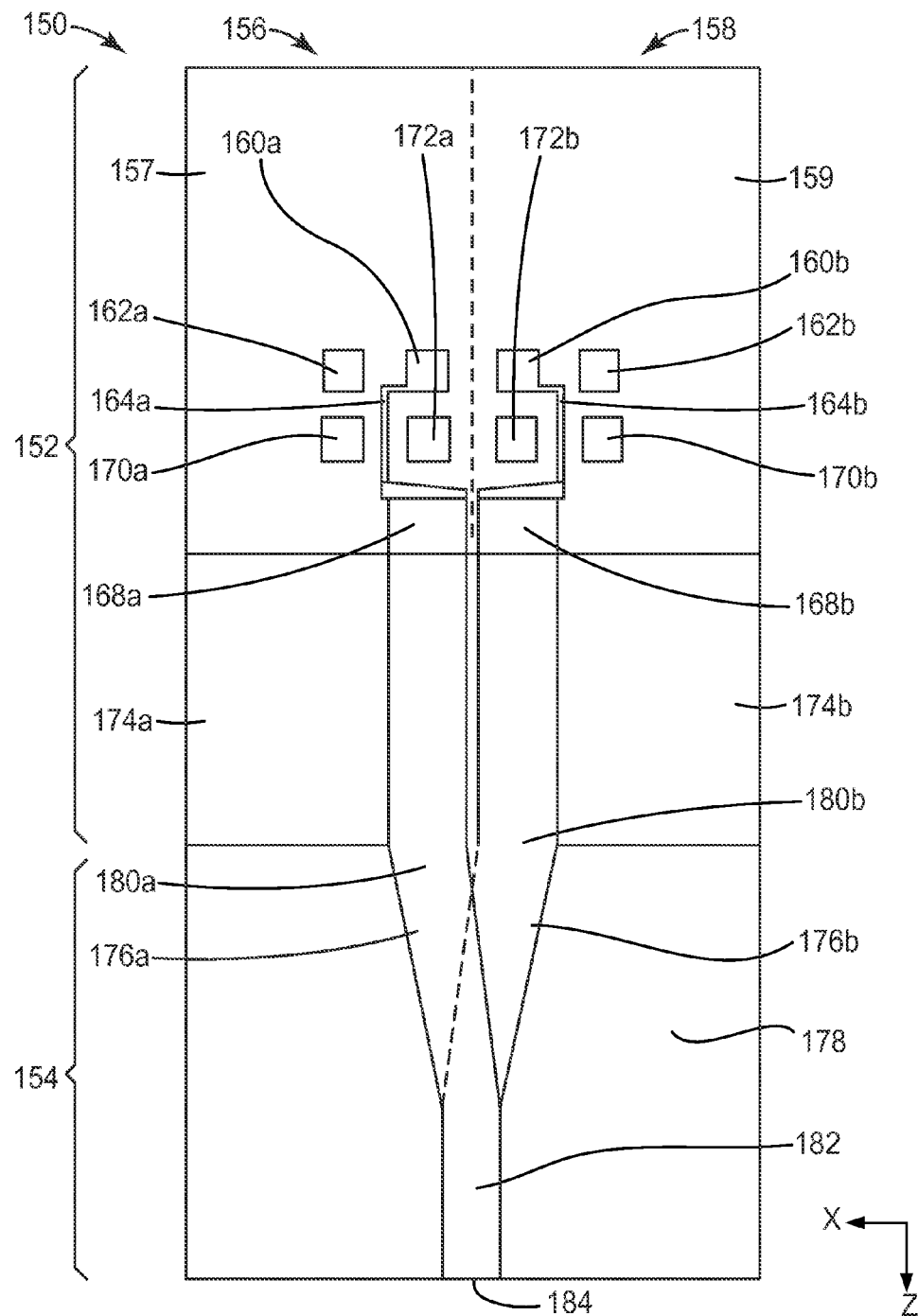
FIGS. 4A and 4B are conceptual diagrams illustrating various aspects of an example feedblock.
Figure 4B:
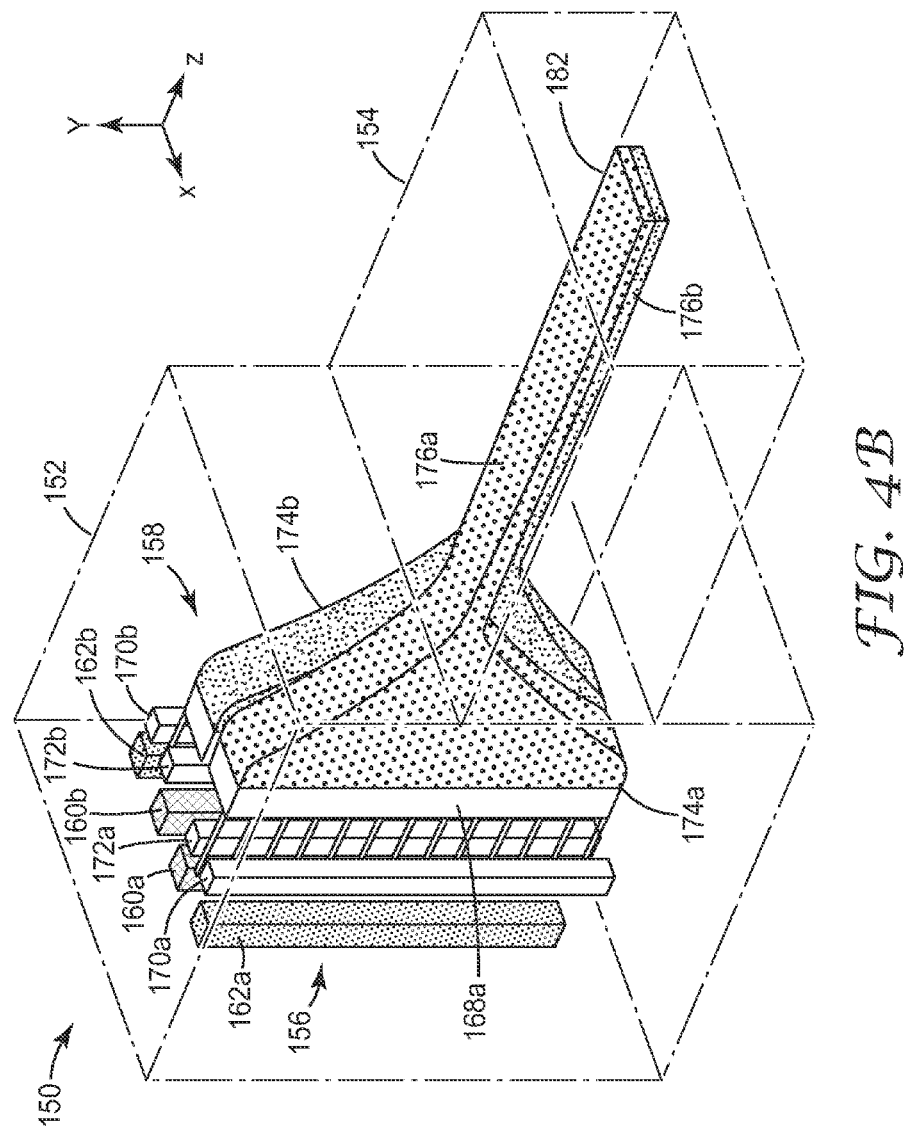

FIGS. 4A and 4B are conceptual diagrams illustrating example feedblock 150. Similar to feedblock 50 of FIGS. 2A and 2B, feedblock 150 may be used in a film line configured to manufacture multilayer polymeric films, such as film line 10 of FIG. 1. In some aspects, feedblock 150 may be configured the same or similar to that of feedblock 50, and may include one or more feature which are substantially similar to features previously described with respect to feedblock 50 of FIGS. 2A and 2B. Accordingly, similar features of feedblock 150 are labeled similarly to those of feedblock 50. For example, feedblock 150 includes first and second flow channels 160a and 162a, respectively, which are substantially the same or similar to first and second flow channels 60a and 62a, respectively, of feedblock 50.

As shown in FIGS. 4A and 4B, feedblock 150 includes packet creator section 152 and packet combiner 154, which act in combination to generate the described multilayer flow stream output from the received polymeric materials. Packet creator section 152 includes first packet creator 156 within housing 157, and second packet creator 158 within housing 159.

First packet creator 156 includes first flow channel 160a, second flow channel 162a, first plurality of conduits 164a, second plurality of conduits 166a (not shown in FIG. 4A), slot die section 168a, thermal tuning mechanisms 170a and 172a, and compression section 174a. Similarly, second packet creator 158 includes first flow channel 160b, second flow channel 162b, first plurality of conduits 164b, second plurality of conduits 166b (not shown in FIG. 4A), slot die section 168b, layer thickness tuning mechanisms 170b and 172b, and compression section 174b.

First packet creator 156 and second packet creator 158 are each configured to independently generate a single primary packet. After first packet creator 156 and second packet creator 158 generate their respective individual primary packets, packet combiner 154 receives the primary packets via inlets 180a and 180b of first and second channel 176a and 176b, respectively, and combines them into a single multilayer flow stream 182.

Feedblock 150 may differ from feedblock 50 in FIGS. 2A and 2B in one or more aspects. For example, as illustrated in FIGS. 4A and 4B, packet creator section 152 of feedblock 150 may be configured differently than that of packet creator section 52 of feedblock 50. In particular, the configuration of first packet creator housing 157 and second packet creator housing 159 allows for first packet creator 156 and second packet creator 158 to be placed in relatively closer proximity than that of first packet creator 56 and second packet creator 58 of feedblock 50. Additionally, feedblock 150 may not include an isolation section along the boundary between first and second packet creators 156 and 158.

By placing first and second packet creators 156 and 158 in close proximity to each other relative to the x-direction, the relative amount of cross-web direction change (x-direction) required to stack and combine the primary packets generated by first and second packet creators 156 and 158, respectively, is reduced compared to that required in feedblock 50. It is believed that such a configuration may reduce cross-web layer non-uniformities in the respective primary packets and multilayer flow stream 182.

Figure 5A:
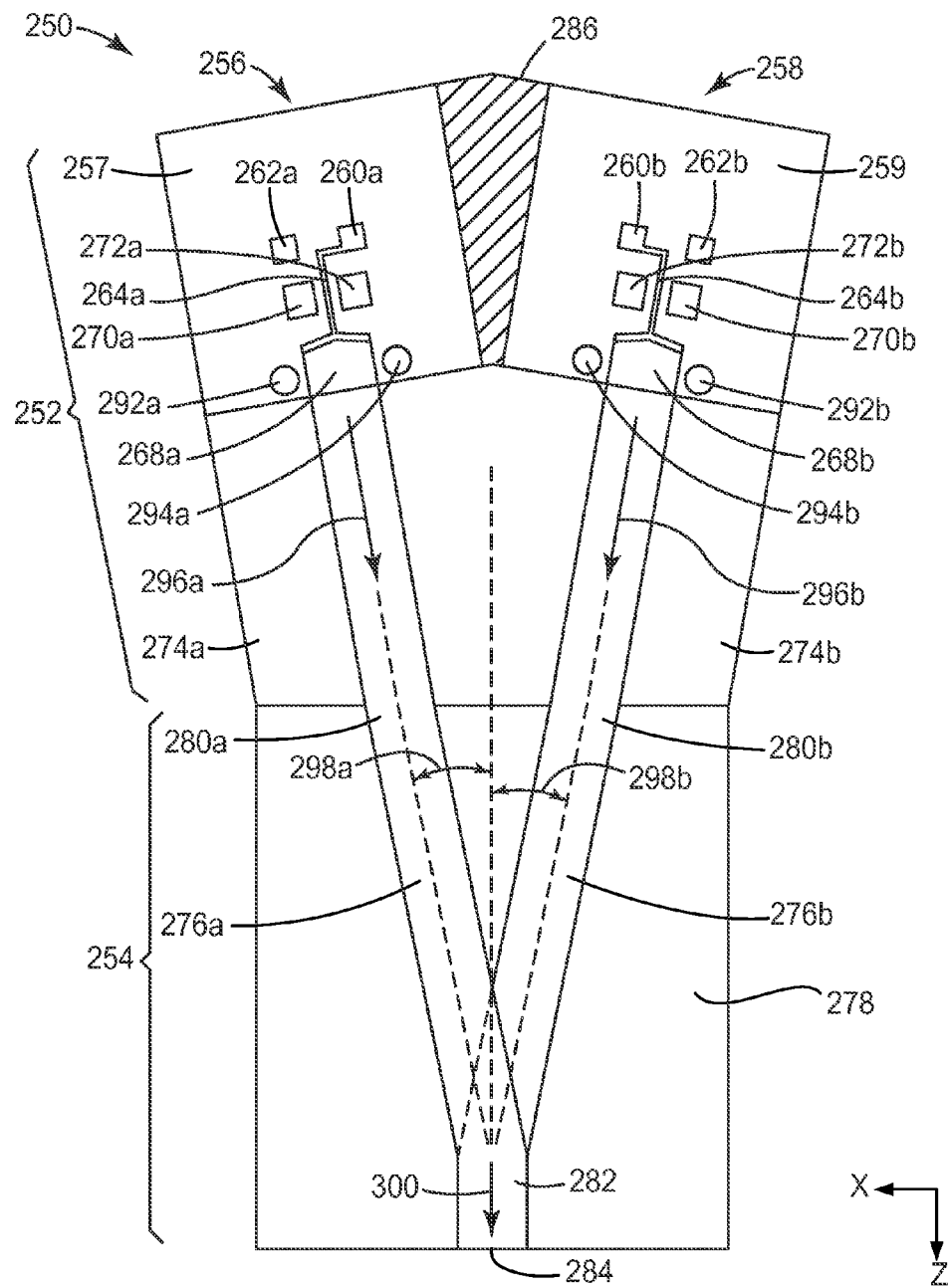
FIGS. 5A-5C are conceptual diagrams illustrating various aspects of an example feedblock.
Figure 5B:
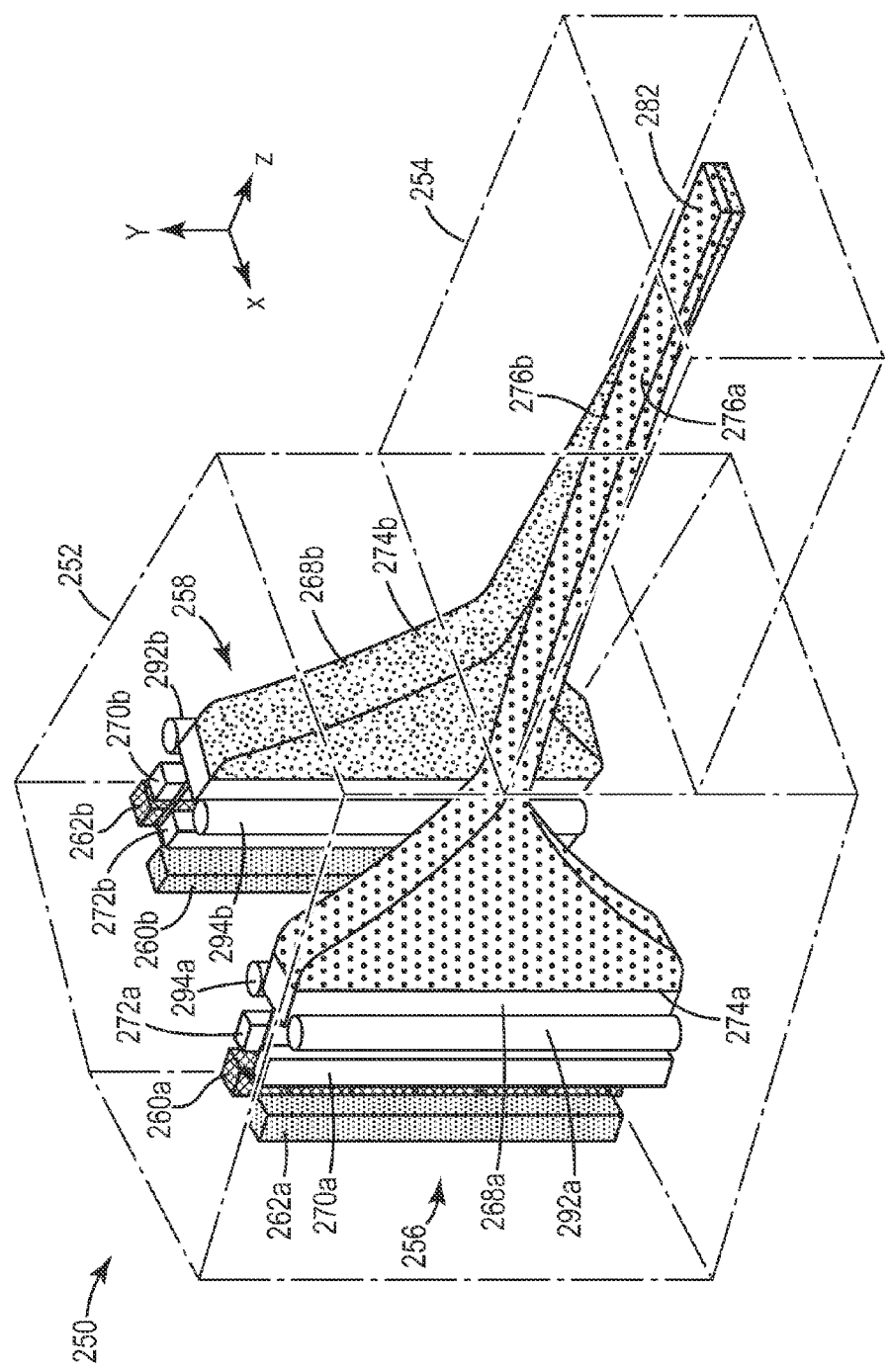
Figure 5C:
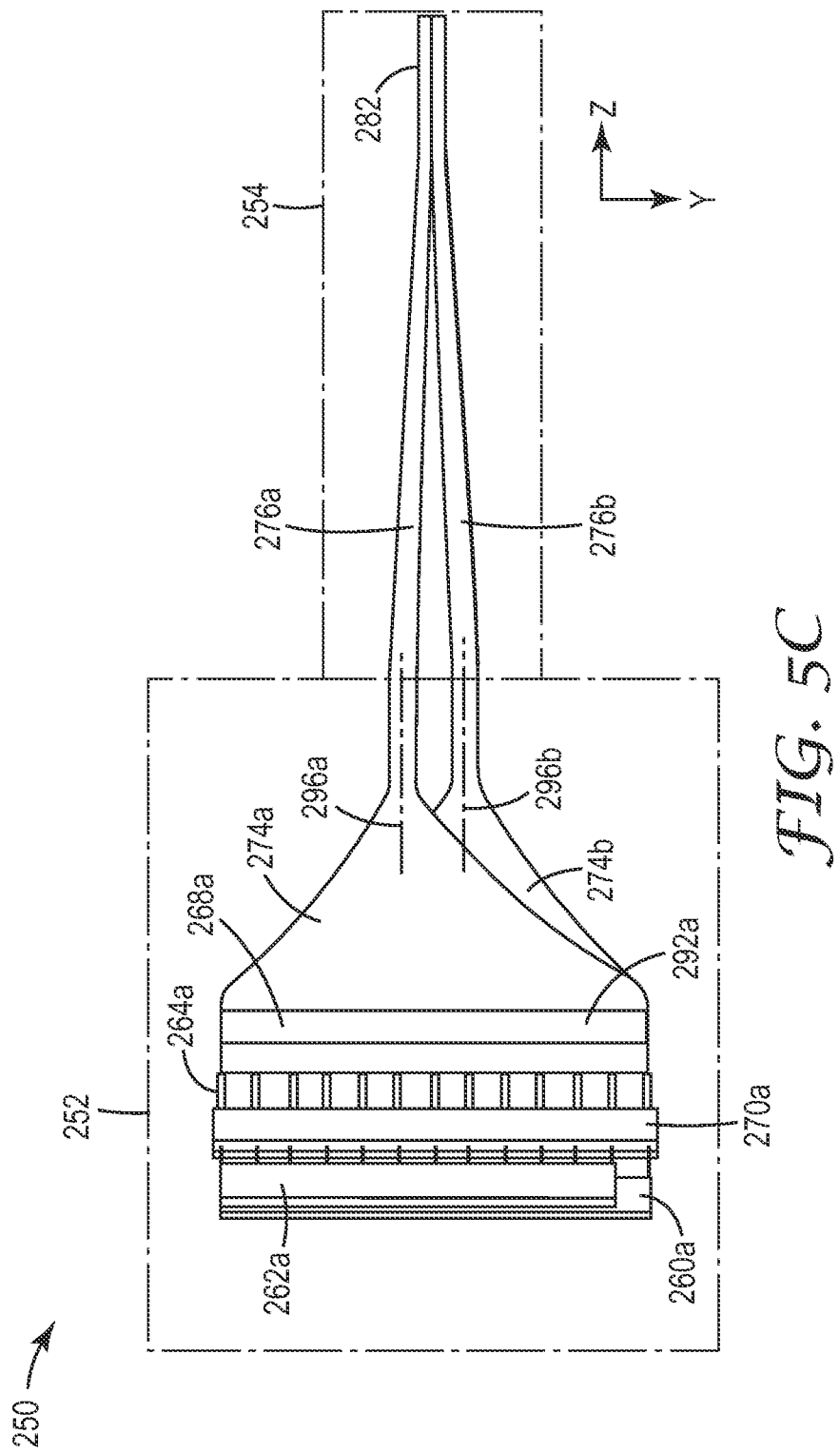

FIGS. 5A-5C are conceptual diagrams illustrating another example feedblock 250. Similar to feedblock 50 of FIGS. 2A and 2B, feedblock 250 may be used in a film line configured to manufacture multilayer polymeric films, such as film line 10 of FIG. 1. In some aspects, feedblock 250 may be configured the same or similar to that of feedblock 50, and may include one or more features which are substantially similar to features previously described with respect to feedblock 50 of FIGS. 2A and 2B. Accordingly, similar features of feedblock 250 are labeled similarly to those of feedblock 50. For example, feedblock 250 includes first and second flow channels 260a and 262a, respectively, which are substantially the same or similar to first and second flow channels 60a and 62a, respectively, of feedblock 50.

As shown in FIGS. 5A-5C, feedblock 250 includes packet creator section 252 and packet combiner 254, which act in combination to generate the described multilayer flow stream output from the received polymeric materials. Packet creator section 252 includes first packet creator 256 which is enclosed within housing 257, and second packet creator 258 which is enclosed within housing 259.

First packet creator 256 includes first flow channel 260a, second flow channel 262a, first plurality of conduits 264a, second plurality of conduits 266a (not shown in FIG. 5A), slot die section 268a, thermal tuning mechanisms 270a and 272a, and compression section 274a. Similarly, second packet creator 258 includes first flow channel 260b, second flow channel 262b, first plurality of conduits 264b, second plurality of conduits 266b (not shown in FIG. 5A), slot die section 268b, thermal tuning mechanisms 270b and 272b, and compression section 274b.

First packet creator 256 and second packet creator 258 are each configured to independently generate a single primary packet. After first packet creator 256 and second packet creator 258 generate their respective individual primary packets, packet combiner 254 receives the primary packets via inlets 280a and 280b of first and second channel 276a and 276b, respectively, and combines them into a single multilayer flow stream 282.

Feedblock 250 may differ from feedblock 50 in FIGS. 2A and 2B in one or more aspects. For example, as shown in FIGS. 5A-5C, first packet creator section 256 includes thermal tuning devices 292a and 294a proximate to slot die section 268a. Likewise, second packet creator section 258 includes thermal tuning devices 292b and 294b proximate to slot die section 268b. In some embodiments, tuning devices 292a and 294a may selectively provide heat to all or portions of slot die section 268a. Similarly, tuning devices 292b and 294b may selectively provide heat to all or portions of slot die section 268b. In each case, the heat provided to slot die sections via the tuning devices may act to control or "tune" one or more properties of the primary packet created by the corresponding packet creator, such as, for example, the cross-web layer thickness profile of a primary packet. Tuning devices 292a, 292b, 294a, and/or 294b may be used in addition to, or instead, of tuning devices 270a, 270b, 272a, and/or 272b as previously described.

As shown in FIG. 5A, first packet creator housing 257 and second packet creator housing 259 are separated by isolation section 286, which may provide substantial thermal isolation between first and second packet creators 256 and 258. In some embodiments, isolation section 286 may simply be a physical void space between first packet creator housing 257 and second packet creator housing 259. However, in other embodiments, isolation section 286 may include one or more materials that provide appropriate thermal isolation between first and second packet creators 256 and 258, as described. In any case, the composition (or lack of in embodiments in which section 286 is a physical void space) and/or the relative dimensions of isolation section 286 may be designed to provide the appropriate amount of thermal isolation between first and second packet creators 256 and 258 such that the layer thickness profiles of the primary packets generated by the respective packets creators may be control or "tuned" substantially independently of one another due at least in part to the relative thermal isolation provided by isolation section 286.

As another example difference from feedblock 50, first and second packet creators 256 and 258 are configured such that the primary packets are formed substantially along flow directions (represented approximately by lines 296a and 296b in FIG. 5A) that are non-parallel to the flow direction at which packet combiner 254 combines the generated primary packets into a single multilayer flow stream 282, as previously described, rather than forming the primary packets along flow directions that are substantially parallel to the flow direction at which packet combiner 54 combines the generated packets in feedblock 50.

As shown, the relative flow direction 296a in which first packet creator 256 generates the first primary packet forms angle 298a with longitudinal axis 300 along which packet combiner 254 combines the respective primary packets to form multilayer flow stream 282. Similarly, the relative flow direction 296b in which first packet creator 258 generates the second primary packet forms angle 298b with longitudinal axis 300 along which packet combiner 254 combines the respective primary packets to form multilayer flow stream 282.

By configuring feedblock 250 such that angles 296a and/or 296b are greater than zero, that is, non-parallel with flow direction 300, sufficient thermal isolation between packet creators 256 and 258, for example, via isolation section 286, may be provided to allow for substantially independent control or "tuning" of the respective primary packets, while also minimizing the relative degree of realignment of the respective primary packet flows in the x-direction that is required within packet combiner 254. In some embodiments, angles 296a and/or 296b may be greater than zero degrees to less than 90 degrees. In some embodiments, angles 296a and/or 296b may range from approximately 5 degrees to approximately 60 degrees, such as, for example, approximately 5 degrees to approximately 30 degrees. In some embodiments, angle 296a may be approximately equal to that of angle 296b, while in other embodiments angle 296a may be different than that of angle 296b.

Referring to FIG. 5C, packet combiners 274a and 274b may function to redirect the flow of the respective primary packets from slot die sections 268a and 268b, respectively, to compress the thickness of a primary packet (in the y-direction) while substantially maintaining the uniformity of the width of layers in the cross-web direction (x-direction). Compression section 274a compresses the primary packet flow in first packet creator 256 to first centerline 296a, and compression section 274b compresses the primary packet flow in second packet creator 258 to second centerline 296b. As shown, in some embodiments, first centerline 296a and second centerline 296b may be offset from one another relative to the y-direction. In this manner, feedblock 50 may minimize distortions that can result from reorientation of the primary packets within packet combiner 254, as previously described.

Figure 6L:
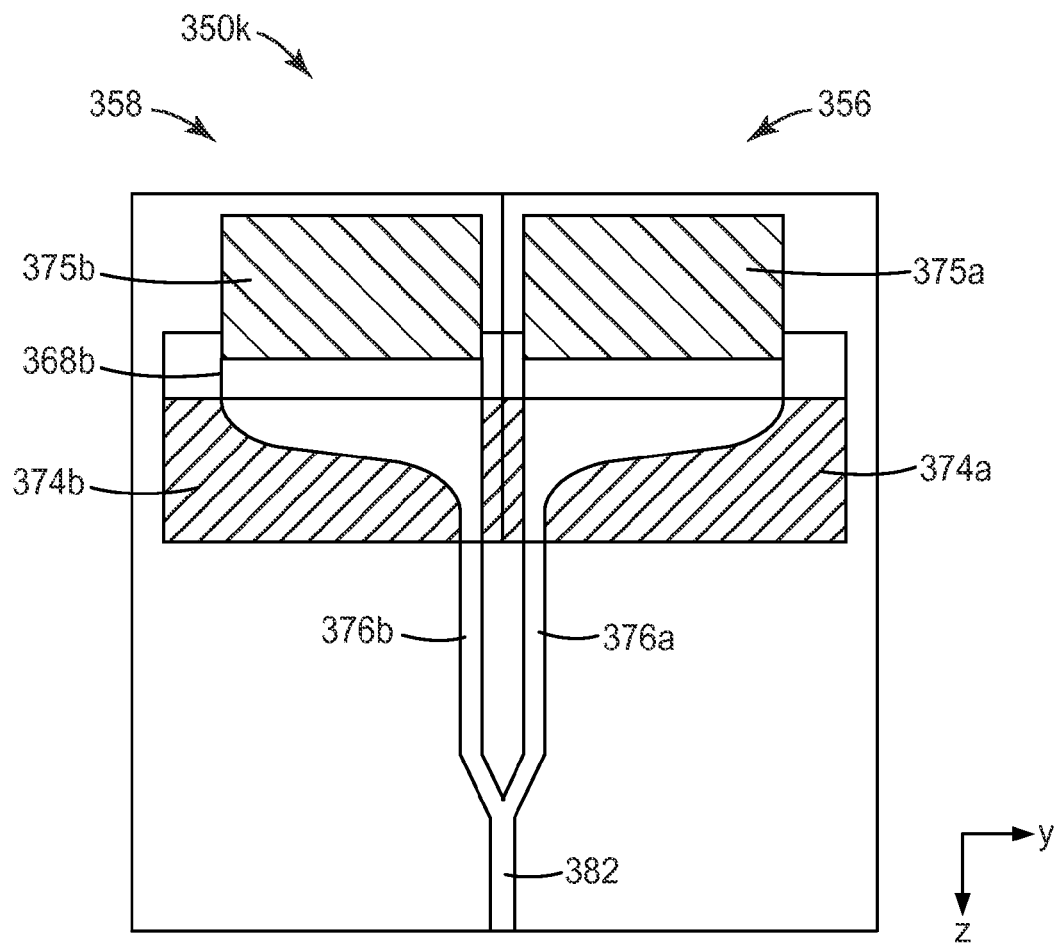

FIGS. 6A-6K are conceptual diagrams illustrating example feedblocks 350a-350k, respectively, which are each designed to generate two primary packets via two separate packet creators. FIG. 6L is a conceptual diagram illustrating example feedblock 350k from a side view.

Similar to feedblock 50 (FIGS. 2A and 2B), feedblock 150 (FIGS. 4A and 4B), and feedblock 250 (FIGS. 5A-5C), each of feedblocks 350a-350k may be used in a film line configured to manufacture multilayer polymeric films, such as film line 10 of FIG. 1. In some aspects, feedblocks 350a-350k may be configured the same or substantially similar to that of feedblocks 50, 150, and/or 250, and may include one or more features which are substantially similar to features previously described with respect to feedblocks 50, 150, and/or 250. For ease of description, similar features of feedblocks 350a-350k are generally named and numbered similarly to those of feedblock 50. For example, feedblocks 350a-350k includes first and second flow channels 360a and 362a, respectively, which may be substantially the same or similar to first and second flow channels 60a and 62a, respectively, of feedblock 50.

Also for ease of description, like features of each of feedblocks 350a-350k are similarly named and numbered throughout FIGS. 6A-6K where applicable. For example, each of feedblocks 350a-350k includes first packet creator 356 and second packet creator 358. However, similar naming and numbering of features between feedblocks 350a-350k does not necessarily imply identical configuration between the various features possessed by feedblocks 350a-350k. Rather, as will be apparent from the following description of feedblocks 350a-350k, various design differences exist between feedblock 350a-350k, which may influence the operation of each of feedblock 350a-350k compared to one another.

As shown in FIGS. 6A-6K, each of feedblocks 350a-350k includes first packet creator 356 and second packet creator 358. First packet creator 356 and second packet creator 358 are each configured to generate a single primary packet in a manner substantially independently from one another. Unless otherwise noted, first packet creator 356 includes first flow channel 360a, second flow channel 362a, first plurality of conduits 364a, second plurality of conduits 366a (not shown), slot die section 368a, thermal tuning mechanisms 370a and 372a, and compression section 374a. Similarly, second packet creator 358 includes first flow channel 360b, second flow channel 362b, first plurality of conduits 364b, second plurality of conduits 366b (not shown), slot die section 368b, thermal tuning mechanisms 370b and 372b, and compression section 374b.

For ease of illustration, first and second packet creators 356 and 358 of feedblock 350j (FIG. 6J) and feedblock 350k (FIG. 6L) are illustrated as generally including first and second layer generation elements 375a and 375b, respectively, in place of the features of flow channels 360, 362, conduits 364, 366, and/or thermal tuning mechanisms 370, 372. In general, first and second layer generation elements 375a and 375b of feedblocks 350j and 350k may feed slot die sections 368a and 368b, respectively, in a manner that allows for first and second packet creators 356 and 358 to independently generate primary packets in combination with compression sections 374a and 374b. As such, in some embodiments, first and second layer generation elements 375a and 375b may include any suitable configuration of flow channels 360, 362, conduits 364, 366, and/or thermal tuning mechanisms 370, 372, including one or more of the example configurations described in this disclosure. Additionally, feedblock 350j includes third packet creator 361 for generating a third primary packet that is combined with the primary packets generated by first and second packet creators 356, 358. Third packet creator 361 includes third layer generation element 375c and slot die section 368c, and may be the same or substantially similar to that of first and second packet creators 356, 358.

As one exception to the above description, as shown for feedblock 350h in FIG. 6H, first packet creator 356 and second packet creator 358 each include only a single thermal tuning mechanism (thermal tuning mechanism 370a and 370b, respectively) adjacent to one side of first plurality of conduits 364a and second plurality of conduits 364b, respectively. Similarly, first packet creator 356 and second packet creator 358 of feedblock 350c in FIG. 6C each include only a single thermal tuning mechanism (thermal tuning mechanism 370a and 370b, respectively), which are shown located between first conduits 364a and second conduits 366a (not shown) in first packet creator 356 and first conduits 364b and second conduits 366b (not shown) in second packet creator 358. However, in other examples, first packet creator 356 and/or second packet creator 358 of feedblock 350h and feedblock 350c may include two or more thermal tuning mechanisms. In such examples, the thermal tuning mechanisms may be located adjacent to both sides of first conduits 364a and second conduits 364b.

The components of first and second packet creators 356, 358 may function to generate both primary packets in the same or substantially similar manner to that described above with regard to feedblocks 50, 150, and 250. After first packet creator 356 and second packet creator 358 generate respective individual primary packets, the primary packets are combined downstream at some point to form a single multilayer flow stream 382. In some embodiments, the first and second packets may be combined with one another without substantially spreading one or both of the packets in the cross-web (x-direction) prior to being combined to form multiplayer flow stream 382. Such a feature may be embodied, for example, in feedblocks 350a-f and 350h-j as shown in FIGS. 6A-F and 6H-J, respectively.

In other embodiments, one or more of the first and second primary packets generated by first and second packet creators 356, 358, respectively, may be spread in the cross-web direction prior to the first and second packets being combined with one another. An example of such an embodiment is shown in FIG. 6G, in which both the first and second packets generated by first and second packet creators 356, 358, respectively, are spread in the cross-web direction (x-direction) prior to being combined with one another to form multilayer stream 382. Examples of cases in which packets generated by first and second packet creators 356, 358 are spread in the cross-web direction prior to being combined with one another are described further below, for example, with regard to FIGS. 10, 11, 13, and 15.

In some embodiments, a packet creator section of a feedblock may include one or more inserts that define the plurality of conduits and slots within the packet creator, such as, for example, first and second conduits 364a, 366a and the slot portion of slot die section 368a within first packet creator 356. In FIGS. 6A-K, for ease of description, such inserts may be individually referred to as insert 390a or 390b, and generally referred to as insert 390. Insert 390 may be one or more plates designed to be removably inserted into a corresponding receiving portion defined by the housing of a packet creator section. In this manner, insert 390 may be removed for modification of conduits 364a, 366a and/or slot 368a (for example, via machining) or replaced with another insert 390 designed to provide for different flow through conduits 364a, 366a and/or slots 368a. As such, insert 390 may provide more added flexibility for adjusting the flow characteristics defined by conduits 364a and slots 368a of first packet creator section 356.

In some embodiments, a common insert may be used to define both the conduits and slots for both a first and second packet creator section of a feedblock. For example, as shown for feedblock 350c of FIG. 6C, first and second plurality of conduits 364a, 366a, and slots die section 368a of first packet creator section 356 are defined by first insert 390a which also defines first and second plurality of conduits 364b, 366b, and slot die section 368b of second packet creator section 358. Similar feedblock examples are shown in FIGS. 6D, 6E, 6H, and 6I.

Alternatively, separate inserts may be used to define the conduits and slots for two packet creator sections of a feedblock. For example, as shown for feedblock 350a of FIG. 6A, first packet creator section 356 includes first insert 390a that defines first and second conduits 364a, 366a, and slot die section 368a, and second packet creator section 358 include first insert 390b that defines first and second conduits 364b, 366b, and slot die section 368b. Insert 390a may be removed, replaced and/or modified independent of insert 390b, and vice versa. Similar examples are shown in FIGS. 6B, 6F, 6G, 6J, and 6K.

In addition to the option of having the conduits and slots of multiple packet creators either defined by a common insert or separate inserts, the conduits and slots of a packet creator section may be defined by separate inserts or common inserts. For example, a single insert may define first and second conduits 364a, 366a and slot die section 368a of first packet creator section 356. Or, alternatively, first and second conduits 364a, 366a may be defined by a separate insert from that of slot die section 368a. Such an example is shown in FIG. 6B, in which first insert 390a defines first and second conduits 364a, 366a, second insert 390b defines first and second conduits 364a, 366a, third insert 390c defines slots die section 368a, and fourth insert 390d defines slot die section 368b. In cases in which separate inserts may be used for defining conduits 364a, 366a and slot die section 368a, those inserts may be common or separate from that of the one or more inserts used to define conduits 364b, 366b, and/or slot die section 368b of second packet creator 358.

In a similar fashion, in some embodiments, a packet creator section of a feedblock may include one or more gradient plate manifolds that define the flow channels of the packet creator, such as, for example, first and second flow channels 360a, 362a within first packet creator 356. In FIGS. 6A-K, for ease of description such gradient plate manifolds may be individually referred to as gradient plate manifolds 392a or 392b, and generally referred to as gradient plate manifolds 392. Gradient plate manifold 392 may be removable from the housing of a packet creator section. In this manner, gradient plate manifold 392 may be removed for modification of, for example, flow channels 360a, 362a or replacement with another gradient plate manifold 392 designed to provide for different flow through flow channels 360a, 362a. As such, gradient plate manifold 392 may provide more added flexibility for adjusting the flow characteristics defined by first and second flow channels 360a, 362a of first packet creator section 356.

In some example, a common gradient plate manifold may be used to define both the first and second flow channels of first and second packet creator section of a feedblock. For example, as shown for feedblock 350c of FIG. 6C, first and second channels 360a, 362a of first packet creator section 356 are defined by first gradient plate 392a which also defines first and second channels 360b, 362b of second packet creator section 358. Similar feedblock examples are shown in FIGS. 6D and 6E.

Alternatively, separate gradient plate manifolds may be used to define the flow channels for two packet creator sections of a feedblock. For example, as shown for feedblock 350a of FIG. 6A, first packet creator section 356 includes first gradient plate manifold 392a that defines first and second flow channels 360a, 362a, and second packet creator section 358 include first gradient plate manifold 392b that defines first and second flow channels 360b, 362b of second packet creator 358. Similar examples are shown in FIGS. 6B, 6F, 6G, 6H, 6I, 6J, and 6K.

The location of the flow channels defined by a gradient plate manifold may vary with respect to the conduits fed by the flow through the flow channels. For example, in feedblock 350a of FIG. 6A, first and second flow channels 360a, 362a defined by gradient plate manifold 392a of first packet generator 356 are configured to feed first and second conduits 364a, 366a from a position above conduits 364a, 366a, with respect to the flow direction of the primary packets generated by the first and second packet creators 356, 358. A similar configuration is exhibited by second packet creator 358 of feedblock 350a. First and second packet creators 356, 358 of feedblocks 350b, 350c, 350d, 350f, 350g, and 350k also exhibit a similar design configuration.

As an alternative design, in feedblock 350h (FIG. 6H), first and second flow channels 360a, 362a defined by gradient plate manifold 392a of first packet generator 356 are configured to feed first and second conduits 364a, 366a from a position beside conduits 364a, 366a with respect to the flow direction of the primary packets generated by the first and second packet creators 356, 358. A similar configuration is exhibited by second packet creator 358 of feedblock 350h. Feedblock 350i also exhibits a similar design configuration.

As another alternative design, in feedblock 350e (FIG. 6E), first and second flow channels 360a, 362a defined by gradient plate manifold 392a of first packet generator 356 are configured to feed first and second conduits 364a, 366a from a position below conduits 364a, 366a with respect to the flow direction of the primary packets generated by the first and second packet creators 356, 358. A similar configuration is exhibited by second packet creator 358 of feedblock 350e.

First and second conduits 364a, 366a defines the flow direction of polymeric melt streams from first and second flow channels 360a, 362a as delivered to slot die section 368a in first packet section 356. In some embodiments, first and second conduits 364a, 366a are configured such that the flow within the conduits is substantially parallel to that of the flow within slot die 368a and/or compression section 374a when delivered to slot die section 368a. Such an example configuration is exhibited by both first and second packet creator 356, 358 of feedblocks 350a, 350b, 350d, 350f, 350g, 350i, and 350k.

In other embodiments, first and second conduits 364a, 366a are configured such that the flow within the conduits 364a, 366a when delivered to slot die section 368a is substantially non-parallel to that of the flow within slot die 368a and/or compression section 374a. Such an example configuration is exhibited by first and second packet creators 356, 358 of feedblock 350e (where the flow direction is substantially orthogonal to flow within slot die section 368a, 368b when delivered to slot die section 368a, 368b) and feedblocks 350c and 350h (where the flow direction is substantially diagonal to flow within slot die section 368a, 368b when delivered to slot die section 368a, 368b).

Slot die section 368a may have a center feed design in which flow from first and second conduits 364a, 366a enter slot die section 368a at approximately the center of slot die section 368a in the cross-web (x-direction). Such a configuration is exhibited by first and second packet creators 356, 358 of feedblocks 350a, 350b, 350c, 350f, 350g, 350h, and 350i.

In other embodiments, slot die section 368a may have a non-center feed design in which flow from first and second conduits 364a, 366a enter slot die section 368a at a position other than that of approximately the center of slot die section 368a in the cross-web (x-direction). For example, slot die section 368a may have a side feed design in which flow from the first and second conduits 364a, 366a enter slot die section 368a at a side or edge of slot die section 368a in the cross-web (x-direction). Such a configuration is exhibited by first and second packet creators 356, 358 of feedblocks 350d and 350e.

The position of one or more thermal tuning mechanisms with regard to the conduits of a packet creator section may vary. For example, within first packet creator 356 of feedblock 350a (FIG. 6A), thermal tuning mechanisms 370a, 372a are positioned symmetrically on either side of first and second conduits 364a, 366a. A similar configuration is exhibited by second packet creator 358 of feedblock 350a. Feedblocks 350b, 350d-350g, 350i and 350k also exhibit a similar design configuration. Feedblocks 350c (FIG. 6C) and 350h (FIG. 6H) exhibit an alternate design in which first and second packet creators 356, 358 include only a single thermal tuning mechanism 370a, 370b, respectively, which is located adjacent to one side of first and second flow conduits 364a, 364b, 366a, 366b.

The flow direction of the multiple layers within the compression sections of respective packet creator sections may be parallel or non-parallel to one another. For example, in feedblock 350a, the flow within compression section 374a of first packet creator 356 is substantially parallel to the flow within compression section 374b of second packet creator 358. First and second compression sections 374a, 374b of feedblocks 350b, 350c, 350d, 350e, 350g, 350h, 350i, and 350k exhibit the same or substantially similar configuration. In feedblock 350j (FIG. 6J), the flow within first and second compression sections 374a, 374b is substantially parallel but opposite to one another. In each of feedblocks 350j and 350k, the first and second compression sections 374a, 374b are stacked on one another in the y-direction rather than being positioned side-by-side. In feedblock 350f (FIG. 6F), the flow within first and second compression sections 374a, 374b is non-parallel to one another and both define a flow direction that is non-parallel to the flow of multilayer flow stream 382, which is the combination of first and second primary packets generated by first and second packet creators 356, 358. Furthermore, feedblock 350j includes third packet creator 361 for generating a third primary packet along a flow direction that is substantially orthogonal to the flow within both the first and second compression sections 374a, 374b.

In embodiments in which the first and second compression sections 374a, 374b of first and second packet creators 356, 358, respectively, are parallel to one another, for example, the relative distance between each compression section 374a, 374b (as well as slot die sections, 368a, 368b) in the cross-web direction (x-direction) may be a design consideration. For example, distance between first and second compression sections 374a, 374b may determine the relative degree that the flows of the first and second primary packets generated by first and second packet creators 356, 358 must be redirected in the cross-web direction (x-direction) to be combined with one another in stacked configuration, for example, within a packet combiner section, to form multilayer flow 382.

First and second compression sections 374a, 374b of feedblock 350e and 350d are relatively closer together in the cross-web direction compared to that of feedblock 350a, for example. Such a configuration may be enabled by the side feed design of slot die sections 368a, 368b of feedblocks 350d, 350e, as described above. The design of feedblocks 350j and 350k allows first and second compression sections 374a, 374b of first and second packet creators 356, 358, respectively, to be aligned or stacked with one another in the cross-web direction. In such examples, the flows of the first and second flows do not have to be significantly redirected in the cross-web direction prior to being combined with one another, for example, in a packet combiner section, to form multilayer flow 382 in a stacked configuration.

In some embodiments, the relative location at which the first and second packet creators generate first and second primary packets, respectively, may be substantially the same as one another or staggered with one another relative the flow stream direction (for example, z-direction). For example, for feedblock 350a (FIG. 6A), first packet creator 356 is configured to generate the first primary packet at substantially the same position as that at which second packet creator 358 generates the second packet relative to the flow stream direction. In such an example, the distance that each primary packet travels after being generated by first and second packet creators 356, 358 before being combined with one another to form multilayer flow stream 382 is substantially equal. Conversely, first and second packet creator sections of a feedblock may be staggered with one another such that the distance that the first primary packet travels to combine with the second packet is greater than the distance that the second primary packet travels to combine with the first primary packet. Such a configuration may be represented by modifying feedblock 350a (FIG. 6A) such that the components of first packet creator section 356 are located at a different position along the z-direction than that of the components of second packet creator section 358.

The degree to which individual packet creators may be isolated from one another in a feedblock including multiple packet creators may vary based on one or more design factors. As described above, the degree of thermal isolation between first and second packet creators of a feedblock may influence the degree to which each primary packet may be "tuned" or controlled independently with regard to the generation of the primary packets by first and second packet creators. For example, the flow of polymeric material through one or more portion(s) of a packet creator (for example, first and second conduits 364a and 366a of first packet creator 356) and, therefore, the layer thickness profile, may be controlled by controlling the temperature at one or more locations within a packet combiner section. Accordingly, to at least some extent, as the degree of thermal isolation between respective packet creator sections increases, so does the degree to which thermally dependent properties of primary packets generated by respective packet creators may be controlled independently of one another within multi-packet creator feedblock.

In some embodiments, thermal isolation between packet creator sections may be increased by increasing the distance between the components (for example, first and second conduits, slot die section, compression section, and/or thermal tuning mechanisms) of the first packet creator and the components of the second packet creator. In particular, the degree of thermal isolation between respective packet creator sections may depend on the physical distance separating the thermal tuning mechanisms of one packet creator (for example, thermal tuning mechanisms 370a, 372a of first packet creator 356) from that of the flow defining components of another packet creator (for example, first and second conduits 364b, 366b of second packet creator 358).

As such, the physical distance between components of the first and second packet creators in the cross-web direction (x-direction) may be increased to increase thermal isolation between the packet creators. In some examples, a feedblock may optionally incorporate a thermal isolation section between first and second packet creators to reduce the thermal crosstalk between the packet creators. For example, as described above, feedblock 50 may include isolation section 86 (FIG. 2A) and feedblock 250 may include isolation section 286 (FIG. 5A) to increase the level of thermal isolation between the first and second packet creators. However, while increasing the distance between the components of first and second packet creators and/or including thermal isolation section between packet creators of a feedblock may increase the level of thermal isolation between first and second packet creators, such separation may also increase the degree to which flows of the primary packets generated by the respective packet creators must be redirected prior to being combined to form a multilayer flow. In some examples, as the angle at which the flow of two packets must be redirected to be combined is increased, the more difficult it may be to achieve and/or maintain cross-web layer uniformity.

Additionally or alternatively, the distance between first and second packet creators 356, 358 may be increased by staggering the components of the respective packet creators of the flow direction (z-direction), for example, as described above, compared to that of a configuration in which the first and second packet creators 356, 358 generate the respective primary packet at substantially the same position as one another in the flow direction. As such, a staggered packet creator configuration may increase the thermal isolation between the respective packet creators of a feedblock.

The level of thermal isolation between first and second packet creators may also depend on whether a feedblock design includes separate or common conduit/slot inserts and/or gradient plate manifolds for the different packet creator sections. As described above, a feedblock, such as, for example, feedblock 350a of FIG. 6A, may be designed such that first and second conduits 364a, 366a and/or slot die section 368a of first packet creator 356 are defined by insert 390a that is separate from that of insert 390b that defines first and second conduits 364b, 366b and/or slot die section 368b of second packet creator 358, while a feedblock, such as, feedblock 350c of FIG. 6C may be designed such that substantially the same components are defined by insert 390a with is common to first and second packet creators 356, 358. In some examples, a design in which separate inserts are utilized for the conduits and slot die section of separate packet creator sections may allow for increased thermal isolation between the respective packet creator sections compared to designs in which a common insert is used to define the conduits and slot die section for the packet creator sections. Similarly, a design in which separate gradient plate manifolds are utilized for the first and second flow channels of separate packet creator sections may allow for increased thermal isolation between the respective packet creator sections compared to designs in which a common gradient plate manifold is used to define the first and second flow channels for the packet creator sections.

The example feedblock configurations described in this disclosure for generating multiple primary packets are primarily described for embodiments including substantially the same configuration for both the first and second packet creators. In such examples, the respective packet creators may be in essence mirror images of each other. However, other embodiments are contemplated for a feedblock including multiple packet creators in which the respective packet creators are different from one another. For example, in one embodiment for a feedblock including first and second packet creators for generating two primary packets that are then combined with one another downstream, the first packet creator may be substantially the same as first packet creator 356 of feedblock 350a (FIG. 6A) and the second packet creator may be substantially the same as second packet creator 358 of feedblock 350c (FIG. 6C). In general, for example feedblocks including multiple individual packet creators, the packet creators may be configured substantially the same as any example packet creator described in this disclosure, and the multiple packet creators of an example feedblock may have substantially the same configurations as one another or may have different configurations from one another.

As described above, in some embodiments, a multi-packet generating feedblock may be configured to generate multiple primary packets and then combine the generated primary packets without substantially spreading the packets in the cross-web direction. For example, feedblock 350a illustrates a configuration in which the first and second primary packets generated by first and second packet creators 356, 358 are combined with one another in packet combiner section 354 to form multilayer flow stream 382 without spreading either the first or second primary packet in the cross-web (x-direction).

Conversely, in some embodiments, a multi-packet generating feedblock may be configured such that the primary packets generated by the respective packet creator sections are spread in the cross-web direction prior to being combined with one another to form a single multilayer flow stream. For example, feedblock 350g of FIG. 6G illustrates a configuration in which the first and second primary packets generated by first and second packet creators 356, 358, respectively, are spread in the cross-web direction prior to being combined with one another to form multilayer flow stream 382. In such a case, multilayer flow stream 382 has a cross-web width greater than that of the cross-web width of the first and second primary packets as generated by first and second packet creators 356, 358. As will be described further below, in some examples, the first and second primary packets may be individually spread in the cross-web direction via separate spreading manifolds of an extrusion die (not labeled in FIG. 6G).

As shown in FIG. 6G, the alignment of the first and second primary packets generated by first and second packet creators 356, 358, respectively, in the cross-web direction (x-direction) is such that the first and second packets are spread asymmetrically in the cross-web direction prior to being combined. That is, each primary packet is spread further in one cross-web direction than the opposite cross-web direction. In this manner, first and second primary packets aligned with one another in the cross-web direction prior to being combined. In other examples, the first and second primary packets may be realigned in the cross-web direction to be substantially aligned with one another and then symmetrically spread in the cross-web direction prior to be combined with one another to form multilayer flow stream 382. Alternatively, first and second packet creators 356, 358 may be stacked with one another rather than side-by-side (for example, in manner the same or similar to that of feedblock 350k of FIGS. 6K and 6L) such that the first and second primary packets are aligned with one another when generated by first and second packet creators 356, 358 without any substantial realignment in the cross-web direction. In such an embodiment, the first and second packets may be spread symmetrically in the cross-web direction and then combined to form multilayer flow stream 382 without realigning the respective packets in the cross-web direction prior to being combined with one another.

Figure 7:
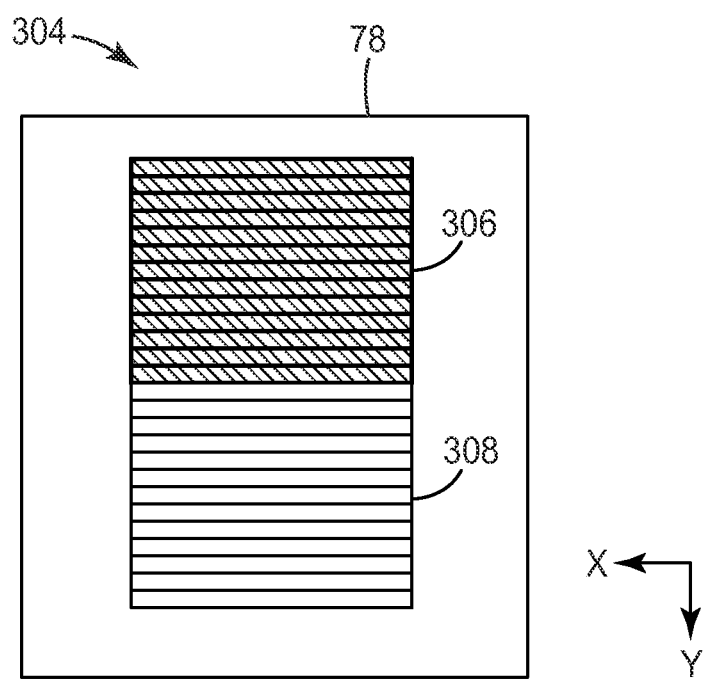
FIG. 7 is a conceptual diagram illustrating an example multilayer flow stream.

FIG. 7 is a conceptual diagram illustrating example multilayer flow stream 304. In particular, FIG. 7 represents multilayer flow stream 304 within a packet combiner of a feedblock, and may illustrate example cross-sectional views of packet combiner 54 of feedblock 50 along line B-B shown in FIG. 2A. Such a cross-sectional view corresponds to a point after two primary packets have been combined with one another in a stacked configuration in packet combiner 54. As such, flow stream 304 includes first portion 306 corresponding to the primary packet generated by a first packet creator, for example, first packet creator 56, and second portion 308 corresponding to the primary packet generated by a second packet creator, for example, second packet creator 58.

As previously described, a packet combiner 36 may combine packets 38 and 40 by reorienting the flow of the respective packets relative to one another other such that at least a portion of the respective primary packets are stacked when combined by combiner 36. If at least a portion of packets 38 and 40 are stacked when combined with one another, then at least a portion of the resulting multilayer stream 32 includes a total number of individual layers approximately equal to that of the sum of the number of individual polymeric layers in packets 38 and 40.

Referring to FIG. 7, multilayer flow stream 304 is representative of an embodiment in which packet creator 54 has changed the orientation of a first and second primary packet relative to one another such that first portion 306 and second portion 308 are substantially fully stacked on one another when combined. In particular, the cross-web width (x-direction) of the first portion 306 and second portion 308 are substantially equal, and, as shown, the edges of portions 306 and 308 are substantially aligned with one another in the cross-web direction. In this manner, substantially all of multilayer flow stream 304 includes a number of individual polymeric layers, along the y-direction, equal to the sum of the number of layers in first portion 306 and second portion 308. While FIG. 7 illustrates first portion 306 and second portion 308 in a substantially fully stacked configuration, in some embodiments, packet combiner 54 may be designed such that first portion 306 and second portion 308 are only partially stacked on one another rather than substantially fully stacked on one another when combined. For example, the cross-web width (x-direction) of the first portion 306 and second portion 308 may not be substantially equal to one another and/or the edges of portions 306 and 308 may not be substantially aligned with one another in the cross-web direction. In any case, the stacking configuration may allow for a multilayer flow stream including polymeric layers formed from both first packet creator 56 and second packet creator 58 stacked on one another.

As shown in FIG. 7, first portion 306 and second portion 308 may illustrate an example in which first and second multilayer packets are combined to form multilayer flow stream 304 without being spread in the cross-web direction prior to being combined with one another. That is, the cross-web width of both first and second portions 306, 308 is substantially that same as that of the cross-web width of primary packets generated via first and second packet creators 56 and 58, respectively. In such an example, after the first and second packets are combined to form multilayer flow stream 304, flow stream 304 may then be spread in the cross-web direction. For example, in some cases, within extrusion die 20 (FIG. 1), multilayer flow stream 304 may enter a spreading manifold configured to spread the multilayer flow stream in the cross-web direction prior to exiting extrusion die 20.

In other embodiments, such as those examples described below with regard to FIGS. 10, 11, 13, and 15, one or more primary packets or packets derived there from (for example, multilayer packets derived from a primary packet via a multiplier device) may be spread in the cross-web direction prior to being combined with one another to form multilayer flow stream 304. In some embodiments, flow stream 304 may be further spread in the cross-web direction after the individual packets are combined with one another after being spread individually in the cross-web direction. Alternatively, multilayer flow stream 304 may be formed by combining multilayer packets that have not been spread in the cross-web direction on an individual basis prior to being combined with one another to form multilayer flow stream 304.

Figure 8:
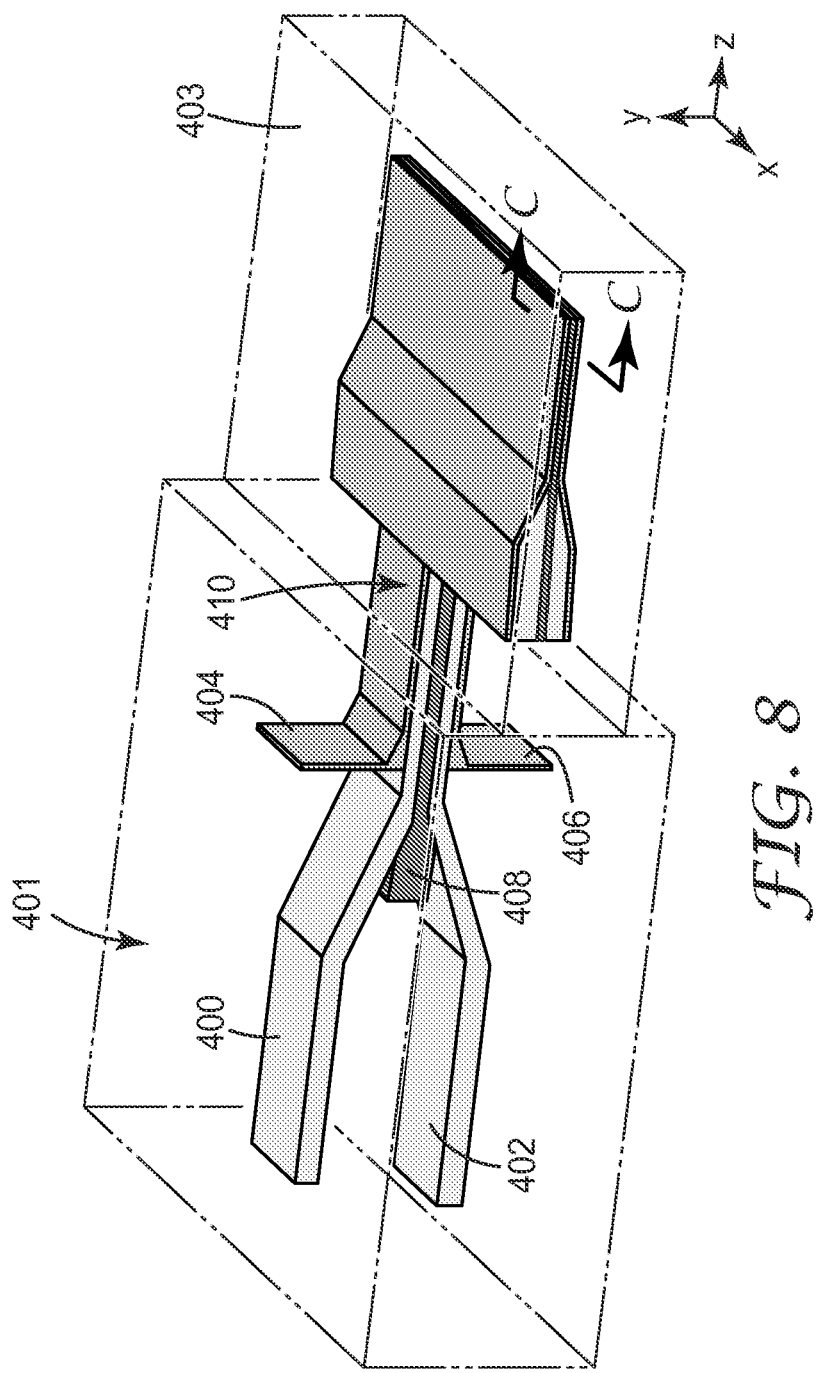
FIG. 8 is a conceptual diagram illustrating an example packet combiner and extrusion die.

FIG. 8 is a conceptual diagram illustrating example packet combiner 401 and extrusion die 403. Packet combiner 401 is configured such that one or more supplemental layers may be added to first and second multilayer packets 400 and 402, respectively, proximate to the multilayer packets 400, 402 being combined with one another to form single multilayer flow stream 410. In particular, the various channels defined within packet combiner 401 define the flow of first multilayer packet 400 (individual layers not shown), second multilayer packet 402 (individual layers not shown), first skin layer 404, second skin layer 406, and core layer 408 such that individual flows are combined with one another to form multilayer flow stream 410. Such a configuration may be implemented, for example, within any packet combiner section of a feedblock including but not limited to one or more of the example feedblocks described herein, (for example, packet combiner section 54 of feedblock 50). First multilayer packet 400 and second multilayer packet 402 may be generated using any feedblock apparatus configuration described herein, although any other suitable configuration capable of generating two or more multilayer primary packets may also be used.

As shown in FIG. 8, prior to the combination of first packet 400 and second packet 402 within packet combiner 401, the flow path of core layer 408 is directed between first packet 400 and second packet 402. Packet combiner 401 then directs the flows to combine core layer 408, first packet 400, and second packet 402 into a single flow, which is subsequently combined with the flows of skin layers 404 and 406 to form multilayer flow 410. After multilayer flow 410 is generated by packet combiner 401, multilayer flow 410 enters extrusion die 403. Extrusion die 403 may be the same or substantially similar to that of extrusion die 20 of FIG. 1. Within extrusion die 403, multilayer flow 410 is spread in the cross-web direction (x-direction) using a spreading manifold and then compressed in the y-direction to reduce the thickness of multilayer flow 410. Each flow may be spread in the cross-web direction substantially simultaneously with one another (as shown), may be spread sequentially, or some combination thereof. Additionally, the flows may be spread and combined substantially simultaneously or may be spread and then combined sequentially.

Figure 9:
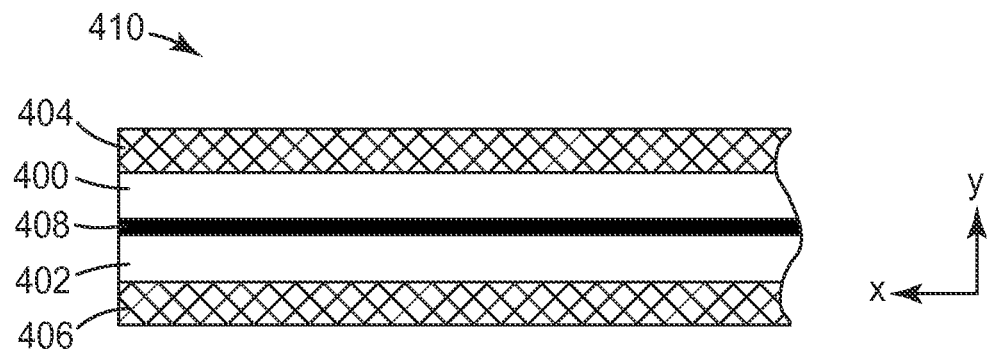
FIG. 9 is a conceptual diagram illustrating an example cross-sectional view of the multilayer flow in the example extrusion die shown in FIG. 8 along cross-section C-C.

FIG. 9 is a conceptual diagram illustrating a cross-sectional view of multilayer flow 410 in extrusion die 403 along cross-section C-C shown in FIG. 8. Multilayer flow 410 includes portions corresponding to first packet 400 and second packet 402 separated by core layer 408. First skin layer 404 of multilayer flow 410 is on the opposite side of first packet 400 from that of core layer 408. Similarly, second skin layer 406 of multilayer flow is on the opposite side of second packet 402 from that of core layer 408.

Using the configuration of FIG. 8, packet combiner 401 may combine the individual flows (first and second packets 400, 402, skin layers 404, 406, and core layer 408) for each portion of multilayer flow 410 prior to being spread in the cross-web direction via extrusion die 403. In other embodiments, packet combiner 401 and extrusion die 403 may be configured such that first multilayer packet 400, second multilayer packet 402, first skin layer 404, second skin layer 406, and/or core layer 408 are individually spread in the cross-web direction and then combined together to form multilayer flow 410.

Figure 10:
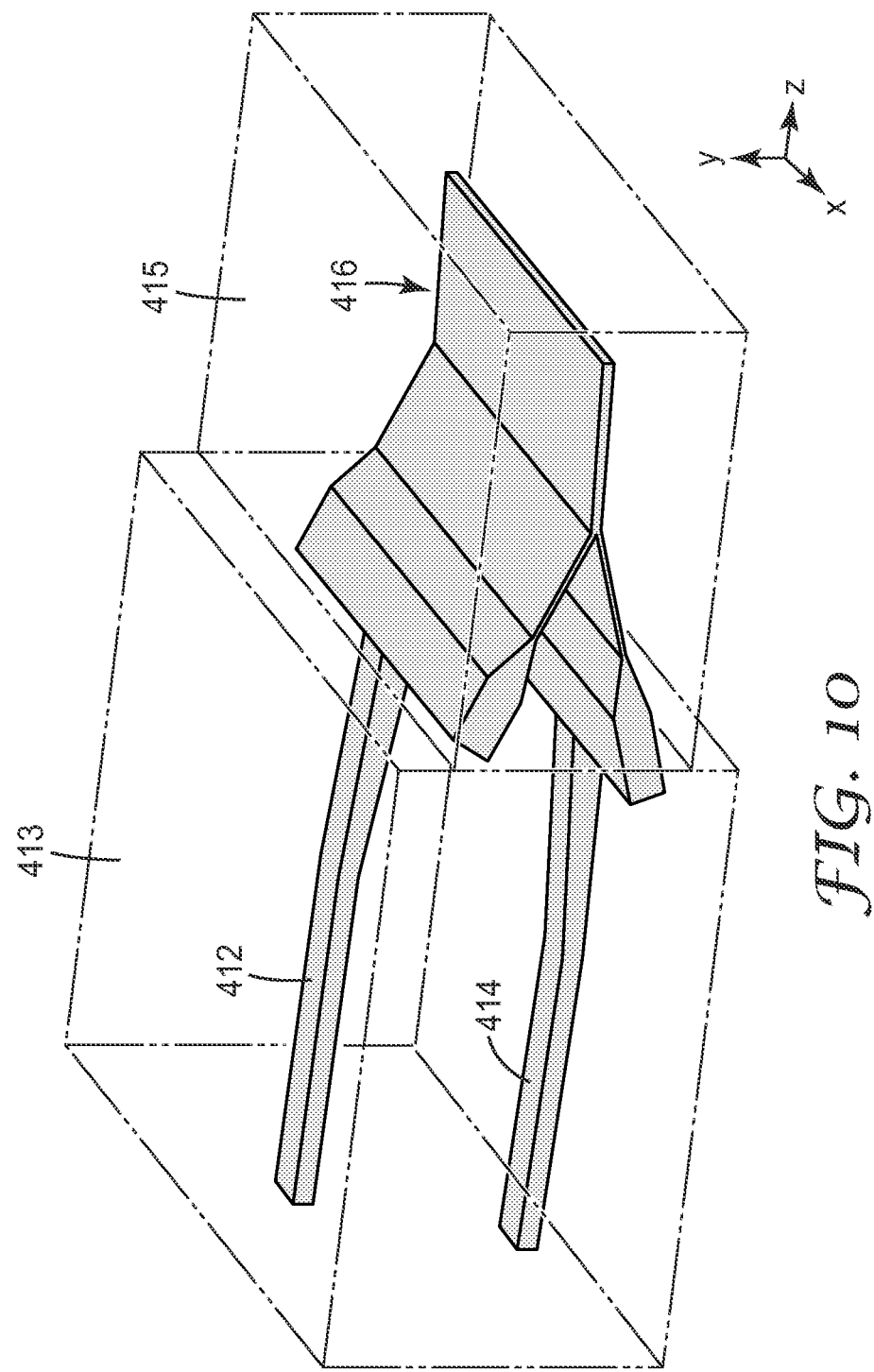
FIG. 10 is a conceptual diagram illustrating example packet transporter and extrusion die.

FIG. 10 is a conceptual diagram illustrating example packet transporter 413 and extrusion die 415. Packet transporter 413 and extrusion die 415 are configured such that first multilayer packet 412 and second multilayer packet 414 are spread in the cross-web direction prior to being combined with one another to form multilayer flow stream 416. Again, first multilayer packet 412 and second multilayer packet 414 may be generated using any feedblock apparatus configuration described herein, although any other suitable configuration capable of generating two or more multilayer primary packets may also be used.

As shown in FIG. 10, packet transporter section 413 is not configured to combine first multilayer packet 412 and second multilayer packet 414. Instead, packet transporter 413 defines the flows of first packet 412 and second packet 414 such that the flows are maintained apart from one another within packet transporter 413 and delivered separately to extrusion die 415. The flows of packets 412, 414 both have a substantially rectangular shape, the corners of which may be rounded, when entering extrusion die 415 that is defined by the width and thickness of the flow streams. Within extrusion die 415, both first packet 412 and second packer 414 are then spread in the cross-web direction, for example, via spreading manifolds of extrusion die 415, and may also be compressed in the y-direction. Such spreading and compression changes both the width and thickness of the flows prior to being combined with one another. After being spread individually in the cross-web direction within extrusion die 415, first and second packet 412, 414 are combined with one another to form multilayer flow stream 416.

Extrusion die 415 may be configured to sequentially or simultaneously spread packets 412 and 414. In some embodiments, first and second packets 412, 414 may be spread to substantially the same or different dimension in the cross-web direction, that is, first and second packets 412, 414 may have substantially the same or different width after being spread in the cross-web direction. In some embodiments, first and second packets 412, 414 may be spread within extrusion die 415 to a cross-web width desired for multilayer flow stream 416 to be further processed by one or more apparatuses downstream in film line 10 (FIG. 1).

In some examples, non-uniformities in the cross-web profile may be reduced by spreading first and second packets 412, 414 individually rather than after being combined with one another. In some cases, the rapid rearrangement in the velocity profile once the flow streams of multiple packets, as well as any additional layer flows (for example, a core layer flow), are combined may contribute to non-uniformities in the cross-web profile of the final film produced in film line 10 (FIG. 1). In other cases, the potential for increased shear stress that results can make some layer structures vulnerable to flow instabilities that are initiated when the flows streams are combined together, the degree of which may depend on process conditions and/or polymeric resins that are being used to form the respective layers. Although flow channel geometry within a packet combining section for cases in which packets are not spread prior to being combined may be manipulated to address one or more of the issues above, a configuration in which multilayer packets as well as any additional layer flows are combined without being spread in the cross-web direction may limit cross-web layer uniformity, maximum process rates, and/or the thickness of an additional layer, such as, a core layer separating two packets.

By spreading first and second packets 412, 414, as well as any additional layers (such as, for example, core layer 418 shown in FIG. 11), in the cross-web direction prior to combining the respective flows, improved uniformity may result. For example, a separate spreading manifold may be used to spread each flow in the cross-web direction rather than using a single spreading manifold to spread the flow stream resulting from the combination of packets 412, 414, as well as any additional layers. As such, each separate manifold may be tailored to each flow stream by taking into account material properties (for example, viscosity, elasticity, density) and process conditions (for example, flow rate, temperature) that may be unique to each flow.

Figure 11:
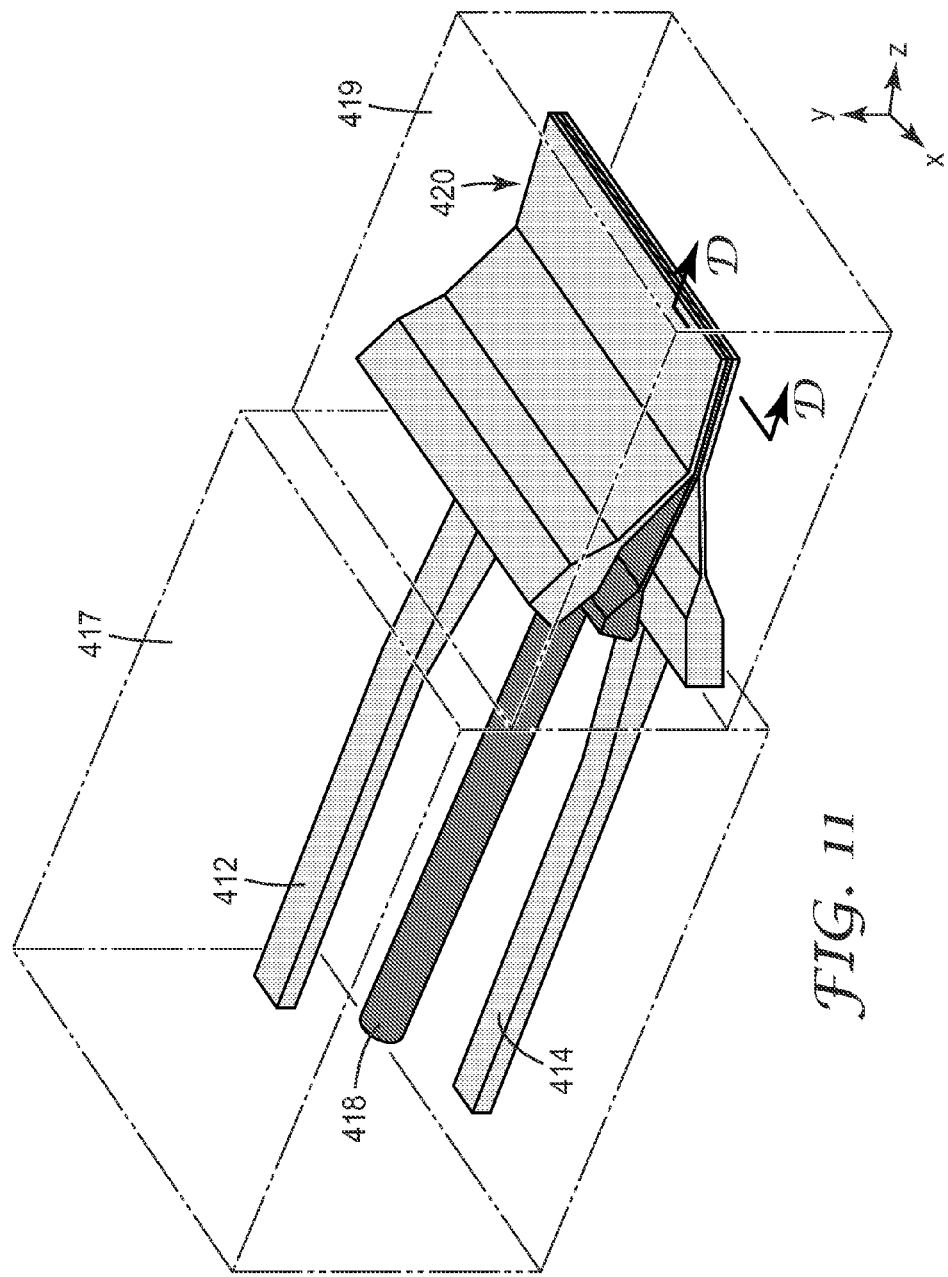
FIG. 11 is a conceptual diagram illustrating another example packet transporter and extrusion die.

FIG. 11 is a conceptual diagram illustrating another example packet transporter 417 and extrusion die 419. Packet transporter 417 and extrusion die 419 may be similar to that of packet transporter 413 and extrusion die 415 of FIG. 10. For example, packet transporter 417 is configured to deliver first multilayer packet 412 to extrusion die 419 separate from that of second multilayer packet 414, at which point first packet 412 and second packet 414 are separately spread in the cross-web direction and then combined with one another to form a portion of multilayer flow stream 420.

However, unlike that shown in FIG. 10, packet transporter 417 also defines the flow of core layer 418. The composition of core layer 418 may be substantially the same or similar to that of core layer 408 (FIG. 8). As shown, core layer 418 is delivered by packet transporter 417 to extrusion die 419 between and separate from that of first packet 412 and second packet 414. Extrusion die 419 then spreads core layer 418 in the cross-web direction and also compresses core layer 418 in the y-direction. Once reoriented, core layer 418 is combined with first packet 412 and second packet 414, each of which has also been spread in the cross-web direction prior to being combined to form multilayer flow stream 420. First packet 412, second packet 414 and core layer 418 may be combined within extrusion die 419 substantially simultaneously with one another (as shown in FIG. 11) or may be combined sequentially to form multilayer stream 420.

A configuration in which core layer 418 is spread in the cross-web direction and then combined with first and second packets 412, 414 may be used, for example, when core layer 418 is relatively thick and/or composed of material that is relatively difficult to coextrude. In FIG. 11, the spreading manifold for core layer 418 may be tailored specifically to account for the specific rate and/or material properties of the core layer material. In this manner, a wider range of polymeric resin material may be used to form core layer 418 compared to a case in which core layer 418 is coextruded with the flows of packets 412, 414. Such a configuration may address the potential to initiate flow instabilities with elastic resins when flow streams are joined at high shear stress and/or extension rates. Similarly, such a configuration may address undesirable layer rearrangement that may be caused by spreading of multiple resins in the same manifold, and may be exacerbated by use of shear thinning resins.

Figure 12:
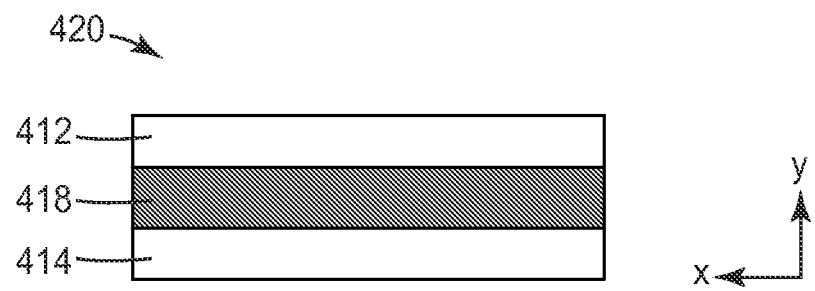
FIG. 12 is a conceptual diagram illustrating an example cross-sectional view of the multilayer flow in the example extrusion die shown in FIG. 11 along cross-section D-D.

FIG. 12 is a conceptual diagram illustrating a cross-sectional view of multilayer flow 420 in extrusion die 419 along cross-section D-D shown in FIG. 11. Multilayer flow 420 includes portions corresponding to first packet 412 and second packet 414 separated by core layer 418. In some examples, core layer 418 may be inserted between first and second packets 412, 414 in multilayer flow stream 420 in cases in which packets 412, 414 are intended to be separated from one another, for example, in a post-tentering operation, to form two separate multilayer films from single multilayer flow stream 420. In such examples, the core layer material may be selected to provide for a degree of adhesion to the first and second packets 412, 414 that allows for separation from core layer 418 at some later point in time, for example, prior to being wound on roll 26 (FIG. 1). In other examples, core layer 418 may be included to increase the rigidity of manufactured film, for example, beyond that provided by the combination of first and second packets 412, 414.

Figure 13:
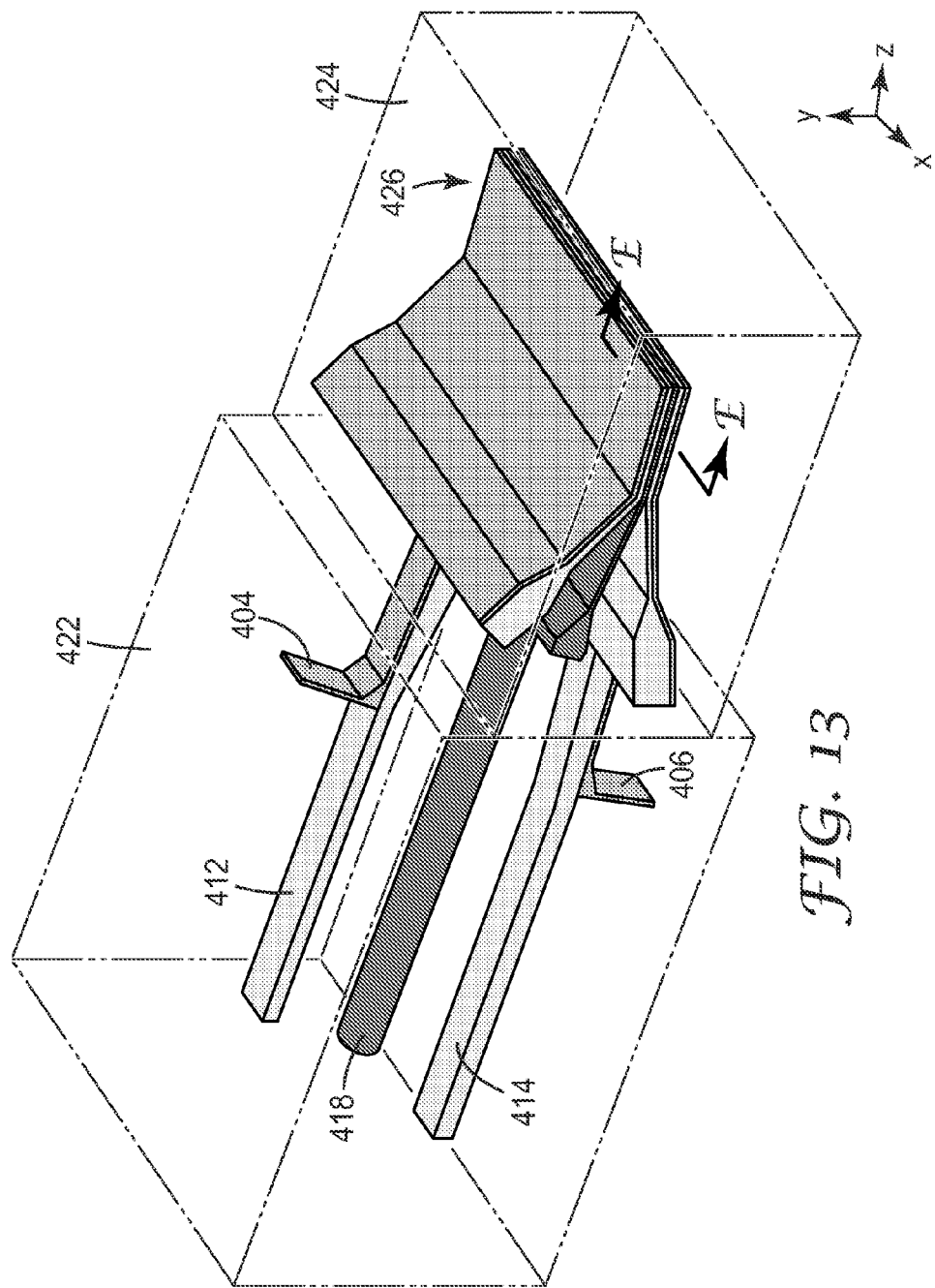
FIG. 13 is a conceptual diagram illustrating another example packet transporter and extrusion die.

FIG. 13 is a conceptual diagram illustrating example packet transporter 422 and extrusion die 424. Packet transporter 422 and extrusion die 424 may be similar to that of packet transporter 413 and extrusion die 415 of FIG. 10. In particular, packet transporter 422 is configured to deliver the flows of first multilayer packet 412, second multilayer packet 414, core layer 418 separately from one another to extrusion die 424. However, as shown in FIG. 13, packet transporter 422 also defines the flow of first skin layer 404 and second skin layer 406 such that first skin layer 404 and second skin layer 406 are combined with the flows of first packet 412 and second packet 414, respectively, prior to being delivered to extrusion die 424. Following the combination of skin layers 404, 406 with first and second packets 412, 414, respectively, within packet transporter 422, the resulting flows enter extrusion die 424 and are spread in the cross-web direction. In all, three separate flow streams enter extrusion die 424 (that is, first packet 412/first skin layer 404, core layer 418, and second packet 414/second skin layer 406), which are then each spread in the cross-web direction and combined with one another as illustrated in FIG. 13. In this manner, packet transporter 422 and extrusion die 424 are configured such that some of the various flow streams are combined with one another before being spread in the cross-web direction and some of the flow streams are combined after being spread in the cross-web direction.

Figure 14:
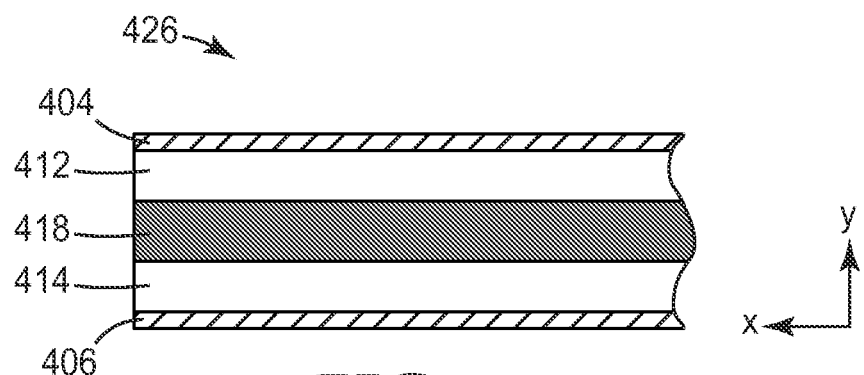
FIG. 14 is a conceptual diagram illustrating an example cross-sectional view of the multilayer flow in the example extrusion die shown in FIG. 13 along cross-section E-E.

FIG. 14 is a conceptual diagram illustrating an example cross-sectional view of multilayer flow 426 in extrusion die 424 along cross-section E-E shown in FIG. 13. Multilayer flow 426 includes portions corresponding to first packet 412 and second packet 414 separated by core layer 418. Multilayer flow 426 further includes portions corresponding to first and second skin layers 404, 406 combined with first and second packets 412, 414, respectively, that form the outer layers of multilayer flow 426.

While the example multiple layer flows illustrated in FIGS. 9, 12, 14 are substantially symmetrical with regard to skin layers 404, 406, other examples are contemplated. In some examples, a packet transporter may be configured such that a skin layer may be provided on only one side of a multilayer flow, more than one skin layer may be on any given side of a multilayer flow, and/or the same or different number of skin layers may be on each side of a multilayer flow. Additionally, even when the number of skin layers in a multilayer flow is symmetrical, the location in the z-direction at which each skin layer is added to the multilayer flow may be the same or different from one another.

Figure 15:
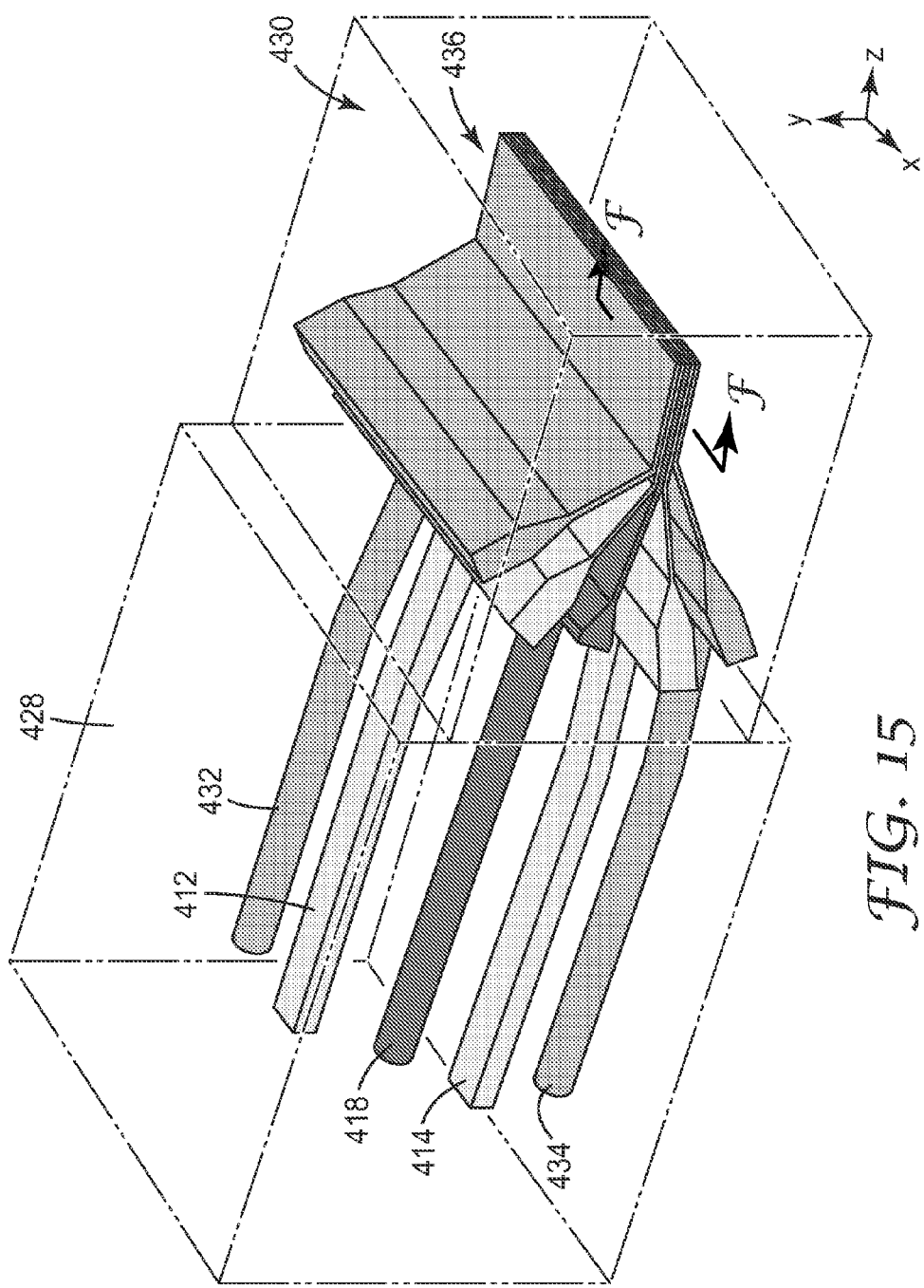
FIG. 15 is a conceptual diagram illustrating another example packet transporter and extrusion die.

FIG. 15 is a conceptual diagram illustrating example packet transporter 428 and extrusion die 430. Packet transporter 428 and extrusion die 430 may be similar to that of packet transporter 417 and extrusion die 419 of FIG. 11. For example, packet transporter 428 is configured to deliver first multilayer packet 412, second multilayer packet 414, and core flow 418 to extrusion die 430 separate from one another. Within extrusion die 430, first packet 412, second packet 414, and core layer 418 are then separately spread in the cross-web direction and then combined with one another to form portions of multilayer flow stream 436.

However, unlike that shown in FIG. 11, packet transporter 428 also defines the flow of first skin layer 432 and second skin layer 434. The composition of first and second skin layers 432, 434 may be substantially the same or similar to that of first and second skin layers 404, 406, respectively, (FIGS. 8 and 13). As shown, the flows of first and second skin layers 432, 434 are delivered by packet transporter 428 to extrusion die 430 separate from that of first packet 412, second packet 414, and core layer 418. Extrusion die 430 then spreads first and second skin layer 432, 434 in the cross-web direction and also compresses the layers in the y-direction in a manner similar to that of first packet 412, second packet 414, and core layer 418. Once spread in the cross-web direction, first packet 412, second packet 414, core layer 418, first skin layer 432, and second skin layer 434 are all combined with each other to form multilayer flow stream 436. First packet 412, second packet 414, core layer 418, first skin layer 432, and second skin layer 434 may be combined within extrusion die substantially simultaneously, sequentially, or some combination thereof to form multilayer stream 436. In some examples, one or more of the flows for core layer 418, first skin layer 432, and second skin layer 434 may be added directly to extrusion die 430 rather than by way of transporter 428.

Figure 16:
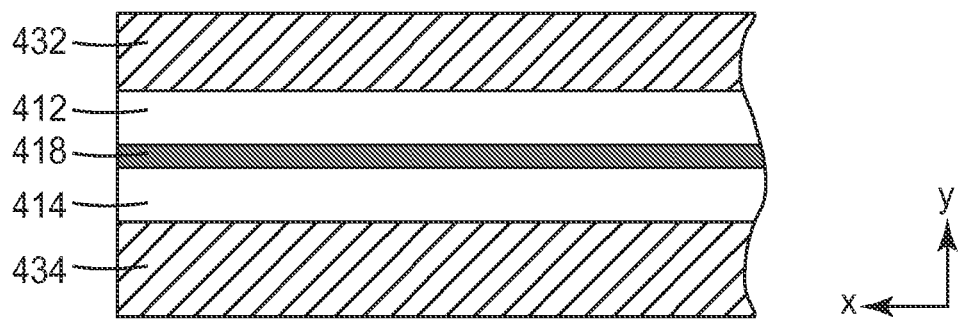
FIGS. 16 and 17 are conceptual diagrams illustrating example cross-sectional views of the multilayer flow in the example extrusion die shown in FIG. 15 along cross-section F-F
Figure 17:
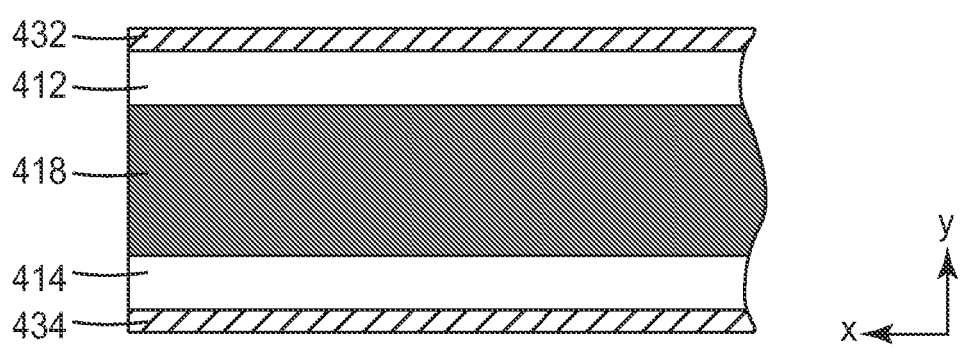

FIGS. 16 and 17 are conceptual diagrams illustrating two example cross-sectional views of multilayer flow 436 in extrusion die 430 along cross-section F-F shown in FIG. 15. The general configuration of multilayer flow 436 shown in FIGS. 16 and 17 is substantially the same as that of multilayer flow 426 show in FIG. 14. For example, the portions corresponding to first packet 412 and second packet 414 are separated by core layer 418, and the portions corresponding to first and second skin layers 432, 434 are combined with first and second packets 412, 414, respectively, to form the outer layers of multilayer flow 436. However, unlike multilayer flow 426 (FIG. 14), each portion (that is, each of first and second packets 412, 414, core flow 418, and first and second skin layers 432, 434) was separately spread in the cross-web direction prior to being combined with one another to form multilayer flow 436. In this manner, the degree to which each of separate portions of multilayer flow 436 are spread in the cross-web direction may be individually controlled, thereby allowing for greater flexibility in how much each portion is spread within extrusion die 430 prior to being combined.

As shown in FIGS. 16 and 17, the thickness (y-direction) of each portion (that is, the layers corresponding to each of first and second packets 412, 414, core flow 418, and first and second skin layers 432, 434) may vary within multilayer flow stream. FIG. 16 illustrates an example in which core layer 418 has a relatively small thickness compared to the thicknesses of first and second packets 412, 414 and first and second skin layers 432, 434. Conversely, FIG. 17 illustrates an example in which core layer 418 has a relatively large thickness compared to the thicknesses of first and second packets 412, 414 and first and second skin layers 432, 434. In FIG. 17, first and second skin layers 432, 434 are also relatively thinner compared to that of the thicknesses of first and second packet 412, 414.

In FIGS. 16 and 17, the thicknesses of first and second packets 412, 414, core flow 418, and first and second skin layers 432, 434 in multilayer flow 436 are symmetric about the center of core layer 418. In other embodiments, the configuration of packet transporter 428 and extrusion die 430 may allow for an asymmetric thickness configuration of first and second packets 412, 414, core flow 418, and first and second skin layers 432, 434. For example, first packet 412 may have a thickness that is different from thickness of second packet 414 within multilayer flow 436. Additionally or alternatively, the thicknesses of first skin layer 432 and second skin layer 434 may be different from one another within multilayer flow 436.

In any case, the thickness of the first and second packets 412, 414, core flow 418, and first and second skin layers 432, 434 may vary relative to each other within multilayer flow 436. By individually spreading first and second packets 412, 414, core flow 418, and first and second skin layers 432, 434 in the cross-web direction in extrusion die 430, the thickness and cross-web width of the corresponding layers within multilayer flow 436 may be independently controlled. In this manner, the thickness of each layer may be controlled as appropriate for each layer within multilayer flow 436 such that the multilayer film or films generated from multilayer flow 436 exhibit one or more desired properties.

Various embodiments of the invention have been described. These and other embodiments are within the scope of the following claims.

The invention claimed is:

1. A method for manufacturing a multilayer article, the method comprising:
   forming a first packet including a first plurality of polymeric layers via a first packet creator, the first plurality of polymeric layers including at least four first individual polymeric layers;
   forming a second packet including a second plurality of polymeric layers via a second packet creator distinct from the first packet creator, the second plurality of polymeric layers including at least four second individual polymeric layers, wherein the first individual polymeric layers are formed at approximately the same time as one another, and the second individual polymeric layers are formed at the same time as one another; and
   combining the first packet and the second packet via a packet combining section of a feedblock,
   wherein the packet combining section comprises:
       a first channel that receives the first packet from the first packet creator; and
       a second channel that receives the second packet from the second packet creator,
   wherein the first channel and the second channel are configured to combine the first and second packets to form a multilayer flow stream including the first plurality of polymeric layers and second plurality of polymeric layers,
   wherein the first packet creator is disposed in the feedblock and includes a first plurality of flow channels, a first plurality of conduits, a first plurality of slots, and a first compression section all in fluid communication with each other and configured to generate the first packet having the first plurality of polymeric layers,
   wherein the second packet creator is disposed in the feedblock and includes a second plurality of flow channels, a second plurality of conduits, a second plurality of slots, and a second compression section all in fluid communication with each other and configured to generate the second packet having the second plurality of polymeric layers,
   wherein for each primary packet generated in the feedblock, the feedblock includes a distinct packet creator having a distinct plurality of flow channels and a distinct plurality of conduits.

2. The method of claim 1, wherein the first packet creator is substantially thermally isolated from the second packet creator.

3. The method of claim 1, wherein the first packet is substantially formed in a first flow direction and the second packet is substantially formed in a second flow direction, wherein the first flow direction and the second flow direction are approximately the same.

4. The method of claim 1, further comprising:
   forming a third packet including a third plurality of polymeric layers; and
   combining the first, second, and third packets to form the multilayer flow stream, wherein the multilayer flow stream includes the first, second, and third plurality of polymeric layers.

5. The method of claim 1, wherein the first packet includes a first material and a second material which substantially make up the first plurality of layers, and wherein the second packet includes a third material and a fourth material that substantially make up the second plurality of layers.

6. The method of claim 5, wherein the first material is substantially the same as the third material and the second material is substantially the same as the fourth material.

7. The method of claim 1, wherein a number of layers in the first plurality of first layers is approximately equal to the second plurality of second layers.

8. The method of claim 1, wherein the first packet is substantially formed in a first flow direction, the second packet is substantially formed in a second flow direction, and the first and second packets are combined along a longitudinal axis, wherein the first flow direction defines a first angle with the longitudinal axis and the second flow direction defines a second angle with the longitudinal axis, the first and second angles less than approximately 90 degrees.

9. The method of claim 8, wherein the first and second angles range from approximately 5 degrees to approximately 60 degrees.

10. The method of claim 1, wherein the multilayer flow stream is manufactured into a multilayer optical film.

11. The method of claim 1, wherein a thermal isolation section separates at least a portion of the first packet creator from the second packet creator to substantially thermally isolate the first and second packet creators from one another.

12. The method of claim 1, wherein the first and second packet creators comprise one or more inserts, the one or more inserts defining the first plurality of conduits and first plurality of slots of the first packet creator and a second plurality of conduits and a second plurality of slots of the second packet creator.

13. The method of claim 12, wherein the one or more inserts comprise a first insert and a second insert separate from the first insert, the first insert defining the first plurality of conduits and first plurality of slots, and the second insert defining the second plurality of conduits and second plurality of slots.

14. The method of claim 1, wherein the first and second packet creators comprise a gradient plate manifold, the gradient plate manifold defining the first plurality of flow channels and the second plurality of flow channels.

15. The method of claim 14, wherein the gradient plate manifold comprises a first gradient plate manifold and a second gradient plate manifold separate from the first gradient plate manifold, the first gradient plate manifold defining the first plurality of flow channels, and the second gradient plate manifold defining the second plurality of flow channels.

16. The method of claim 1,
wherein the first packet and second packets flow in a first flow direction within the first and second compression sections, the first plurality of conduits define a second flow direction, and the second plurality of conduits define a third flow direction, and
wherein the first flow direction is different from that of the second and third flow directions.

17. The method of claim 1, wherein the first and second plurality of flow channels are below the first and second plurality of conduits with regard to a flow direction defined by the first and second compression sections.

18. The method of claim 1, wherein the first and second packet creators form the first and second packets at positions that are staggered relative to a flow stream direction.

19. The method of claim 1, further comprising spreading the first packet via a first spreading manifold of the packet combiner in a cross-web direction prior to combining the first packet with the second packet.

20. The method of claim 19, wherein the packet combiner includes an extrusion die, the extrusion die including the first spreading manifold.

21. The method of claim 1, wherein the first plurality of polymeric layers and second plurality of polymeric layers each include at least 20 individual polymeric layers.

* * * * *